United States Patent [19]
Moriura

[11] Patent Number: 5,715,151
[45] Date of Patent: Feb. 3, 1998

[54] CONTROL AND PROTECTION SYSTEM FOR AC-DC CONVERSION SYSTEM

[75] Inventor: Yasutomo Moriura, Tokyo, Japan

[73] Assignee: Kabushiki Kaisha Toshiba, Kawasaki, Japan

[21] Appl. No.: 712,490

[22] Filed: Sep. 11, 1996

[30] Foreign Application Priority Data

Sep. 12, 1995 [JP] Japan .................. 7-234517

[51] Int. Cl.$^6$ .................. H02H 7/125; H02J 3/36
[52] U.S. Cl. .................. 363/54; 363/35
[58] Field of Search .................. 363/35, 51, 53, 363/54, 56

[56] References Cited

U.S. PATENT DOCUMENTS

| | | | |
|---|---|---|---|
| 4,264,951 | 4/1981 | Konishi et al. | 363/35 |
| 4,307,442 | 12/1981 | Yano et al. | 363/51 |
| 4,333,119 | 6/1982 | Schoenmeyr | 361/76 |
| 4,639,848 | 1/1987 | Sakai . | |
| 5,170,334 | 12/1992 | Ito et al. | 363/54 |
| 5,179,510 | 1/1993 | Tokiwa et al. | 363/54 |
| 5,265,002 | 11/1993 | Bando et al. | 363/54 |

FOREIGN PATENT DOCUMENTS

| | | |
|---|---|---|
| 0 142 096 | 5/1985 | European Pat. Off. . |
| 53-117727 | 10/1978 | Japan . |

OTHER PUBLICATIONS

Patent Abstracts of Japan, vol. 006, No. 222, (E–140), Nov. 6, 1982, JP 57 126274, Aug. 5, 1982.
Handbook for High Voltage Direct Current Technology, Chapter 5, Sec. 5, A Classification of HTDC Faults and Protection Sequence, JIEE, Mar. 30, 1978.
T. Machida, "High Voltage Direct Current", Chapter 6, Sec. 4, Example of Protection Sequences, Feb. 15, 1971.

Primary Examiner—Stuart N. Hecker
Attorney, Agent, or Firm—Oblon, Spivak, McClelland, Maier & Neustadt, P.C.

[57] ABSTRACT

A control and protection system for an AC-DC conversion system for exchanging an electric power between two AC power systems. The AC-DC conversion system is composed of two power converters and two circuit breakers connected to the two AC power systems. Each of the power converters is composed of a plurality of switching devices controlled by a gate signal and converts AC power into DC power or DC power into AC power. The control and protection system is composed of two control and protection units. Each of the control and protection units includes a protection unit for detecting a fault of the power converter to generate a first protection order signal when the fault is detected, and a phase control unit for continuously generating firing pulses to the switching devices of the power converter. Each of the control and protection unit further includes a protection sequence unit connected to the protection unit for receiving the first protection order signal, for holding the first protection order signal, for generating an opening instruction to the circuit breaker, and for generating a second protection order signal for stopping the power converter at another side to the control and protection unit at the another side, while the firing pulses are being supplied to the switching devices of the power converter.

10 Claims, 32 Drawing Sheets

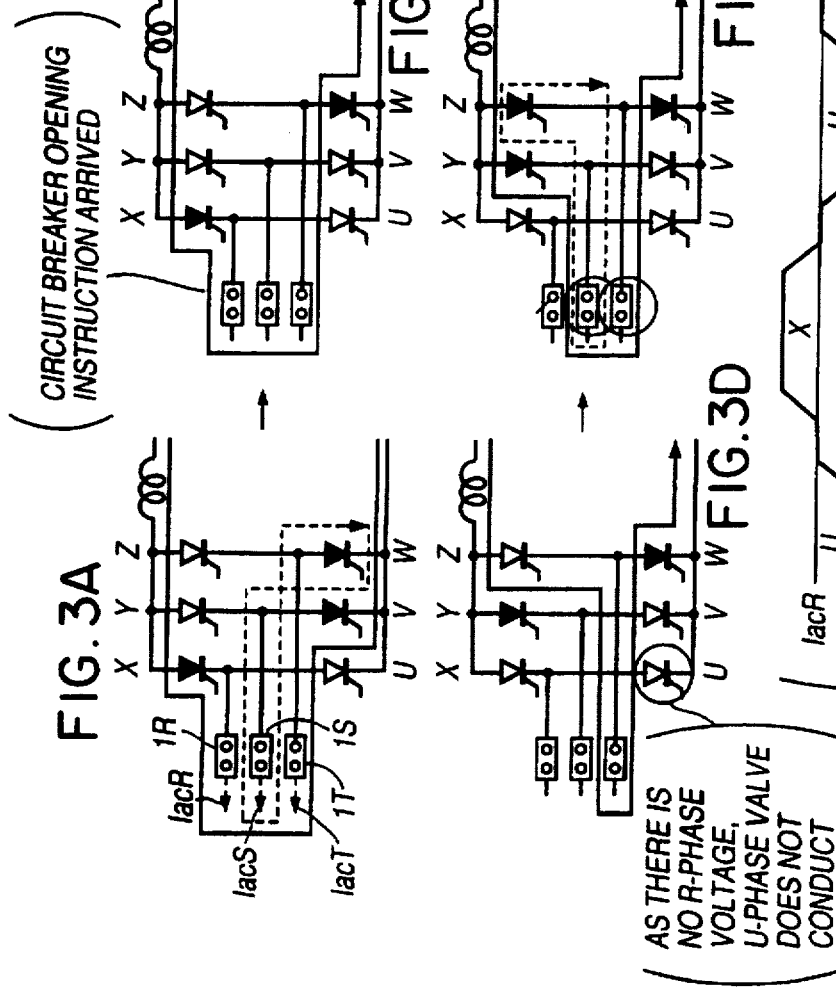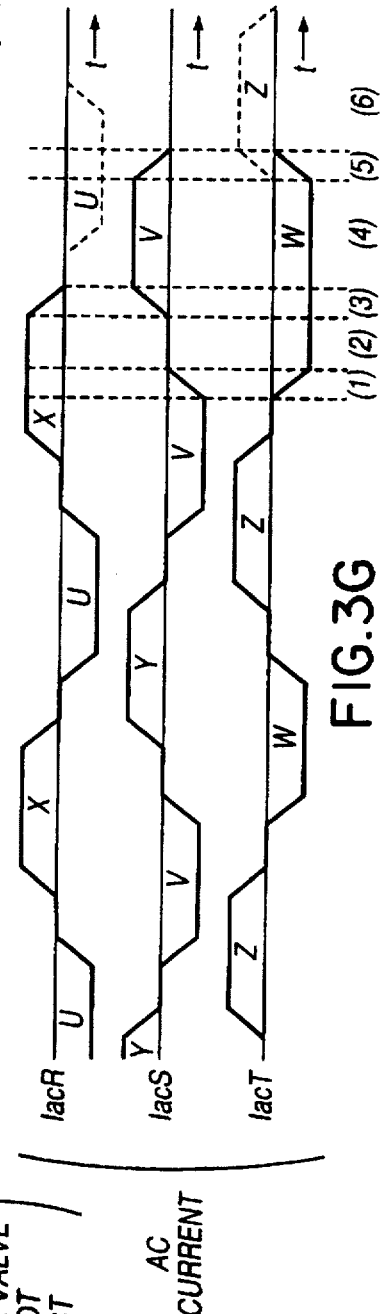

DC VOLTAGE Vdc

DC CURRENT Idc

R-PHASE AC CURRENT IacR

S-PHASE AC CURRENT IacS

T-PHASE AC CURRENT IacT (1) AT FAULT GENERATED (2) DURING GS PERIOD (3) AFTER BPP TURNED ON (1) AT FAULT GENERATED (2) DURING GS PERIOD (3) AFTER BPP TURNED ON

U-PHASE VALVE CURRENT
V-PHASE VALVE CURRENT
W-PHASE VALVE CURRENT

FAULT GENERATED
GS PERIOD
BPP PERIOD (1) AT FAULT GENERATED (2) DURING GS PERIOD (3) AFTER BPP TURNED ON

CONTROL AND PROTECTION SYSTEM FOR AC-DC CONVERSION SYSTEM

BACKGROUND OF THE INVENTION

1. Field of the Invention

This invention relates to an AC-DC conversion system, such as a DC power transmission system and a frequency conversion system, etc., and more particularly to a control and protection system for an AC-DC power conversion system which can stop the operation of the AC-DC conversion system safely.

2. Description of the Related Art

For instance, in the DC power transmission system, AC-DC conversion systems are provided at both ends of a DC transmission line. One of them operates as a rectifier to convert AC power to DC power, while the other operates as an inverter to convert DC power to AC power. One example of a DC power transmission system in the construction with converters thus installed is shown in FIG. 20 and a control and protection system to control AC-DC converter is shown in FIG. 21.

FIG. 20 shows an example of a first AC system AL1 and a second AC system AL2 connected with DC transmission lines L1 and L2. Between AC system AL1 and one ends of DC transmission lines L1 an L2, there is provided a converter station equipped with a circuit breaker 1A composed of three-phase circuit breakers 1AR, 1AS and 1AT, a converter transformer 2A and a power converter 3A composed of a thyristor converter, and a DC reactor 4A. Between AC system AL2 and the other ends of DC transmission lines L1 and L2, there is provided a converter station equipped with a DC reactor 4B, a power converter 3B composed of a thyristor converter, a converter transformer 2B and a circuit breaker 1B composed of three-phase circuit breakers 1BR, 1BS and 1BT.

Further, converter 3A is composed of 6 thyristor valves U, V, W, X, Y, Z, and converter 3B is also composed of 6 thyristor valves U', V', W', X', Y', Z', and DC transmission line L2 is earthed. In this system construction, power is not only transmitted in one direction from one end to the other end between both AC systems AL1 and AL2, but also the system is so constructed that power is transmitted in the reverse direction when required. Accordingly, converters 3A, 3B are constructed so that they can be operated as a rectifier or an inverter in this system, respectively, and the converter at the power source side is operated as a rectifier and the converter at the load side is operated as an inverter depending on the current direction.

In FIG. 21, 5A, 5B are converter control systems (hereinafter referred to as control system), 6A, 6B are gate pulse generators (hereinafter, referred to as PG) to generate gate pulses to thyristor converters 3A, 3B, and 7A, 7B are protection systems of AC-DC converters 3A, 3B, respectively.

8A, 8B are DC voltage transformers (DC-PT), 9A, 9B are DC current transformers (DC-CT), 10A, 10B are AC voltage detectors (AC-VD), and 11A, 11B are AC current transformers for measuring converter transformer currents (AC-CT), respectively. DC voltage Vdc1, Vdc2, DC current signal Idc1, Idc2, AC voltage signal Vac1, Vac2, and AC current signal Iac1, Iac2 detected by these instruments are input to control systems 5A, 5B and protection systems 7A, 7B, respectively.

Control system 5A is provided with a phase controller 50A, a phase detector 51A, a controller 52A and a protection sequence 53A, and control system 5B is provided with a phase controller 50B, a phase detector 51B, a controller 52B and a protection sequence 53B, which have functions shown below, respectively.

That is, controller 52A does both the constant current control to control DC current Idc1 detected by DC-CT 9A to a constant level and the constant voltage control to control DC voltage Vdc1 detected by DC-PT 8A to a constant level, respectively, under the steady state. Out of two controlled outputs, controller 52A outputs the constant current controlled output in the case of rectifier operation and the constant voltage controlled output in the case of inverter operation to phase controller 50A as a phase control angle $\alpha$.

Controller 52B does also both the constant current control to control DC current idc2 detected by DC-CT 9B to a constant level and the constant voltage control to control DC voltage Vdc2 detected by DC-PT 8B to a constant level, respectively in the steady state. Out of these two controlled outputs, controller 52B outputs the constant current controlled output in the case of rectifier operation and the constant voltage controlled output in the case of inverter operation to phase controller 50B as a phase control angle $\alpha$. Here, in the case of rectifier operation, phase control angle $\alpha$ is set to, for example 20°, and in the case of inverter operation it is set to, for example, 135°, respectively.

When a protection order signal is transmitted from protection system 7A at own side, protection sequence 53A outputs the protection order signal to control system 5B at the other side, and at the same time takes the timing of such pulse operations as gate shift (hereinafter referred to as GS), by-pass pair (hereinafter referred to as BPP), gate block (hereinafter referred to as GB) and a circuit breaker opening instruction (hereinafter referred to as CBT), and when a protection order signal is transmitted from control system 5B at the other side is transmitted, takes the timing of GS, BPP and GB. Protection sequence 53A outputs such pulse operation signals as GS, BPP and GB to phase controller 50A in each of two cases.

When a protection order signal is transmitted from protection system 7B at own side, protection sequence 53B outputs the protection order signal to control system 5A at the other side, and at the same time takes the timing of such pulse operations as GS, BPP, GB and CBT, and when a protection order signal is transmitted from control system 5A at the other side, takes the timing of GS, BPP and GB. Protection sequence 53B outputs such pulse operation signals as GS, BPP and GB to phase controller 50B in each of two cases.

Phase detector 51A inputs AC voltage Vac1 of AC system AL1 detected by AC-PT 10A and outputs a phase signal to synchronize AC voltage Vac1. Phase detector 51B inputs AC voltage Vac2 of AC system AL2 detected by AC-PT 10B and outputs a phase signal to synchronize AC voltage Vac2.

Phase controller 50A has the..function to output a phase control pulse PHS to PG 6A according to phase control angle $\alpha$ from controller 52A based on the phase signal from phase detector 51A in the steady state. Phase controller 50A has also the following functions when stopping for protection according to signals GS, BPP and GB from protection sequence 53A. That is, in case of signal GS, it outputs phase control pulse PHS of a gate shift phase, such as 120°, in case of signal BPP, it outputs a BPP pulse as phase control pulse PHS, and in case of signal GB, it blocks phase control pulse PHS. Phase controller 50B has the function to output phase control pulse PHS to PG 6B based on the phase signal from phase detector 51B according to phase control angle $\alpha$ from controller 52B in the steady state. Phase controller 50B has also the following functions when stopping for protection according to signals GS, BPP and GB from protection sequence 53B. That is, in case of signal GS, it outputs phase control pulse PHS of a gate shift phase, such as 120°, in case of signal BPP, it outputs BPP pulse as phase control pulse, and in case of signal GB, it blocks phase control pulse PHS.

PG 6A is composed of a forward/reverse voltage detector 61A which detects forward/reverse voltages of converter 3A an a gate pulse generator 60A which generates gate pulse to be applied to converter 3A from phase control pulse PHS and forward/reverse voltages. Gate pulse generator 60A generates 120° width pulses for each thyristor of converter 3A based on phase control pulse PHS received from control system 5A, and if GB instruction is received from control system 5A, resets this 120° width pulses. Gate pulse generator 60A generates gate pulses to be applied to thyristor converter 3A according to the AND condition of 120° width pulses and forward voltage signal from forward/reverse voltage detector 6A which detects forward/reverse voltage of converter 3A. Gate pulse generator 60A also has a forced firing function that if reverse voltage applied to the thyristor during the turn-off is insufficient, outputs gate pulse again to the thyristor when forward voltage is detected.

PG 6B is composed of a forward/reverse voltage detector 61B which detects forward/reverse voltage from converter 3B and a gate pulse generator 60B which generates gate pulse to be applied to converter 3B from phase control pulse PHS and forward/reverse voltages. Gate pulse generator 60B generates 120° width pulses for each thyristor of converter 3B based on phase control pulse PHS from control system 5B, and if GB instruction is received from controller 5B, resets this 120° width pulses. Gate pulse generator 60B generates gate pulses to be applied to thyristor converter 3B according to the AND condition of 120° width pulse and forward voltage signal from forward/reverse voltage detector 6B which detects forward/reverse voltages of converter 3B. Gate pulse generator 60B also has a forced firing function that if reverse voltage applied to the thyristor during the turn-off is insufficient, outputs gate pulse again to the thyristor when forward voltage is detected.

Protection system 7A monitors the magnitude, etc. of AC current Iac1, AC voltage Vac1, DC current Idc1 and DC voltage Vdc1 of AC-DC conversion system, detects such converter faults as short-circuit, ground fault, etc. from these voltages and currents, and outputs a protection order signal to control system 5A at own side. Protection system 7B monitors magnitude, etc. of AC current Iac2, AC voltage Vac2, DC current Idc2 and DC voltage Vdc2 of AC-DC conversion system, detects such converter faults as short-circuit, ground fault, etc. from these voltages and currents, and outputs a protection order signal to control system 5B at own side.

In such the conventional control and protection system of AC-DC conversion system as described above, converters at the rectifier side and the inverter side operate in cooperation with each other. When any fault is detected, not only the converter at own side is protected by the control system at own side but also the protection order signal is transmitted to the control system at the other side, and the AC-DC conversion system is stopped to operate by cooperating with the other side control system in order to dispose energy of the DC circuit.

Next, the protection sequence of control system 5A will be explained referring to FIG. 22. Although the description of control system 5B is omitted here for convenience of explanation, protection sequence 53B of control system 5B is in the same construction as protection sequence 53A of control system 5A.

Further, conventional examples of the protection sequence will be explained, taking the protection sequence of GS-BPP-CBT-GB presented in the timing chart shown in FIG. 23 as an example in case of the inverter and the protection sequence of GS-GB-CBT presented in the timing chart shown in FIG. 24 in case of the rectifier. The description of such protection sequence as instantaneous BPP-CBT-GB without GS or instantaneous GB-CBT without GS that is performed in case of a fault where there is no time to spare for the gate shift because of overvoltage/overcurrent involved in the fault will be omitted, because it is a well known technique to construct a control and protection system of an AC-DC conversion system with such protection sequence as described above.

Now, assume a case where some fault has taken place at converter 3A side (e.g., ground fault, short-circuit, etc.) and at least one of AC voltage Vac1, AC current Iac1, DC voltage Vdc1 and DC current Idc1 becomes abnormal. At this time, a protective relay 70A in protection system 7A which is monitoring these voltages/currents detects this abnormal state and outputs a protection order signal to control system 5A through digital interface circuits 71A and 54A.

In control system 5A, the protection order signal is input to an own side protection order signal holding circuit 531A. Holding circuit 531A judges based on this protection order signal and a rectifier instruction REC as to whether converter 3A is in the inverter state or in the rectifier state by an AND circuit 531a and an AND circuit 531b, and holds respective states by flip-flop circuits 531c, 531d. That is, flip-flop circuit 531c holds the protection order signal at the inverter operation and flip-flop circuit 531d holds the protection order signal at the rectifier operation. Output signals of flip-flop circuits 531c, 531d are output to an own side protective operation timing cooperating circuit 532A and also, are output as a protection order signal to control system 5B at the other side via an OR circuit 531e and a digital interface circuit 59A.

In own side protective operation timing cooperating circuit 532A, in case of the inverter state, signal GS is output via an OR circuit 532a, signal BPP is output after on-delay timer TH1 and signal GB is output after on-delay timer TH2 after signal BPP is output to phase controller 50A. At the same time when signal BPP is output, signal CBT is output to AC circuit breaker 1A via an OR circuit 532c and a digital interface circuit 57A. Signal GB is also output to PG 6A via a digital interface circuit 58A.

Further, in case of the rectifier state, signal GS is output via OR circuit 532a, and signal GB is output after on-delay timer TH3 to phase controller 50A. At the same time when signal GB is output, signal CBT is output to AC circuit breaker 1A via OR circuit 532c and digital interface circuit 57A. In phase controller 50A, protective operating instructions GS, GB are input to a phase control pulse generator 501A, in which in case of signal GS phase control pulse PHS is output equivalent to the phase control angle of 120° and in case of signal GB, phase control pulse PHS is locked.

On the other hand, instruction BPP is input to a BPP selection circuit 502A and BPP phase is selected according to, for instance, a method to judge a valve to be a BPP phase, that is series connected with the thyristor valve to which phase control pulse PHS that is lastly output. BPP selection circuit 502A outputs one of signals BPP-R, BPP-S and BPP-T to phase control pulse generator 501A based on the judgement.

Then, when a fault has taken place at the terminal of converter 3B and it is detected by protection system 7B, control system 5B outputs a protection order signal to control system 5A in the same protection sequence as control system 5A. In control system 5A, this protection order signal is input to an another side protection order signal holding circuit 533A via a digital interface circuit 55A. Holding circuit 533A judges based on this protection order signal and rectifier instruction REC, as to whether converter 3A is in the inverter state or in the rectifier state by an AND circuit 533a and an AND circuit 533b, and holds respective states by flip-flop circuits 533c, 533d, respectively. That is, flip-flop circuit 533c holds the protection order signal at the inverter operation and flip-flop circuit 533d holds the protection order signal at the rectifier operation.

Output signals of flip-flop circuits 533c, 533d are input to an another side protective operation timing cooperation circuit 534A, which is composed of OR circuits 534a, 534b, 534c and on-delay timers TH1', TH2', TH3' likewise own side protective operation timing cooperation circuit 532A. In case of the inverter state, the protection sequence of GS-BPP-CBT-GB is carried out and in case of the rectifier state, the protection sequence of GS-GB-CBT is carried out, and protective operating instructions GS, BPP, GB, CBT are output to phase controller 50A, PG 6A and circuit breaker 1A, as in own side protective operation timing cooperation circuit 532A.

If it is strictly described, own side protective operation timing cooperating circuit 532A outputs such signals GS1, BPP1, GB1 and CBT1 with a suffix 1, and another side protective operation timing cooperating circuit 534A outputs such signals GS2, BPP2, GB2 an CBT2 with a suffix 2. Protection sequence 53A is further provided with OR circuits 535A, 536A, 537A and 538A. Signals GS1 and GS2 are input to OR circuit 535A, which outputs signal GS to phase control pulse generator 501A. Signals BPP1 and BPP2 are input to OR circuit 536A, which outputs signal BPP to BPP selection circuit 502A. Signals GB1 and GB2 are input to OR circuit 537A, which outputs signal GB to phase control pulse generator 501A and PG 6A via digital interface circuit 58A. Signals CBT1 and CBT2 are input to OR circuit 538A, which outputs signal CBT to circuit breaker 1A via digital interface circuit 57A.

Another conventional example of protective operation timing cooperating circuits 532A, 534A is shown in FIG. 25 and the timing chart of FIG. 25 is shown in FIG. 26. In FIG. 25, the function to take the timing of the protection sequence of GS-GB-CBT in case of the rectifier state and the timing of the protection sequence of GS-BPP-CBT-GB in case of the inverter state is the same as the conventional example described above. What are different from the conventional example are that on-delay timers TH3 and TH3' are operated regardless of the rectifier state or the inverter state and that in case of the inverter state, on-delay timers TH3 and TH3' are cooperated with on-delay timers TH1 and TH1' and the system is operated in the sequence similar to the timing chart (GS-BPP-CBT-GB) shown in FIG. 26, respectively.

That is protective operation timing cooperation circuits 532A, 534A take a timing that in case of the inverter, signal BPP is output at a fixed time (TH1) after signal GS is output, signal CBT is output at the same time signal BPP is output, and signal GB is generated at a fixed time (TH2) after signal BPP is output, and in case of the rectifier, signal GB is output at a fixed time (TH3) after signal GS is output and signal CBT is output at the same time signal GB is output. It is a known technique to construct such a control and protection system of AC-DC conversion system with these protection sequence as described above.

The above-described conventional control and protection system is disclosed in Japanese Patent Disclosure (Kokai) No. Sho 53-117727 (Hiroshi Ikeda), published on Oct. 14, 1978.

In the conventional control and protection system of the AC-DC conversion system described above, converters at the rectifier side as well as the inverter side stop to operate while cooperating each other not only during the normal operation but also when stopped due to faults. In particular, when stopped, the converter at the inverter side is stopped by the gate block after put in the BPP state by instruction BPP from control systems 5A, 5B. This is the protecting function for preventing the instantaneous gate block of the inverter.

This inverter gate block will be explained in the following. Now, consider a case where a fault occurs at converter 3A side when operating an AC-DC conversion system in which converter 3A is operated as an inverter and converter 3B is operated as a rectifier without BPP for the protection sequence at the inverter side. At this time, if control system 5B does not receive a protection order signal from control system 5A for some reason, converter 3A blocks the gate but converter 3B which is operated as a rectifier continues the operation as no protection order signal is received.

Accordingly, DC current continuously flows in the AC-DC conversion system as converter 3B continues to operate as a rectifier. On the other hand, the firing pulse to converter 3A is blocked by the gate block and as no commutation is carried out, current continuously flows through the thyristor valve which was conducting at the time of gate block, and as a result, fundamental wave voltage goes into the DC circuit.

Further, as the thyristor valve of converter 3A is turned OFF when DC current becomes to zero, current flow from converter 3B which is operated as a rectifier charges DC transmission lines L1, L2, with the result that DC voltage is overvoltage.

FIG. 27 is a diagram showing voltage and current waveforms at the inverter instantaneous gate block and shows a case when V-phase and X-phase thyristor valves are conducting at the gate block. As shown here, DC voltage Vdc, DC current Idc, R-phase AC current IacR, S-phase AC current IacS and T-phase AC current IacT become the waveforms as shown in (a), (b), (c), (d), and (e) in FIG. 27, respectively, at the instantaneous gate block of the inverter. In this case, the converter can not be stopped safely, and also it may be broken. Further, the AC circuit breaker may cause DC breaking, and furthermore it may be broken.

Because of this, on a conventional system, this instantaneous gate block of inverter is prevented by performing the BPP operation in the stopping operation by the inverter protection sequence. However, on such the control and protection system of AC-DC conversion system, a fault may be further expanded by the BPP operation depending on the aspect of a fault.

One example of the aspect of the fault will be explained in the following. For the convenience of explanation, it is assumed that a ground fault occurs on the R-phase of DC winding of converter transformer 2A when converter 3A is operating as an inverter and converter 3B is operating as a rectifier. Further, for a converter, a valve short-circuit is also a short-circuit phenomenon of two phases of AC voltages and a defective phenomenon occurs similar to the ground fault as explained here.

FIG. 28 shows voltage/current waveforms and FIG. 29 shows the converter operating modes and three-phase valve currents at this time. Protective relay 70A of protection system 7A detects DC winding ground fault, and as converter 3A is in the inverter state, control system 5A actuates the protection sequence of GS-BPP-CBT-GB corresponding to inverter operation. As the ground fault is of one-line ground fault of R-phase of AC voltage, R-phase becomes zero voltage, the phase of S-phase voltage advances by 30° from the phase before the fault and its magnitude becomes √3 times the magnitude before the fault, and the phase of T-phase voltage is delayed by 30° and its magnitude becomes √3 times the magnitude before the fault. During the GS period, PHS pulse of phase angle α of 120° is output.

However, thyristor valves of U-phase and X-phase composing R-phase valve do not conduct because of zero voltage of R-phase, thyristor valves of W-phase and Z-phase composing T-phase do not also conduct as there is no PHS pulse during the forward voltage period. As a result, only V-phase thyristor valve composing S-phase conducts that is able to construct a current loop with the earthing point.

However, as a single phase half-wave rectifier composed of V-phase voltage, leakage reactance of a converter transformer and V-phase thyristor valve is constructed, the current of about 2 times the rated value that is decided by leakage reactance of the converter transformer flows to the V-phase thyristor valve. This stale occurs continuously during the GS period once a cycle of AC voltage.

Further, when the protection sequence progresses and T-phase is determined as BPP-phase according to the BPP instruction, PHS pulse of T-phase is output and PHS pulses of other-phases are not output by BPP pulse. Therefore, W-phase control pulse PHS is retained by PG, and when forward voltage is applied to W-phase (that is, phase control angle α=0°), W-phase is conducted. Therefore, the current flowing to the W-phase thyristor valve becomes an overcurrent that is more than 3 times the rated current decided by the leakage reactance of the converter transformer at the firing phase 0°.

This state is kept until circuit breaker 1A is opened. Needless to say, currents flowing to thyristor valves are different depending on the BPP phase. The block diagram and current waveforms flowing to thyristor valves when S-phase is determined as BPP-phase are shown in FIG. 30, and the block diagram and current waveforms flowing to thyristor valves when R-phase is determined as BPP-phase at this time are shown in FIG. 31.

As seen from these current waveforms, it is seen that if phases other than ground fault phase (here, S-phase and T-phase) are selected as BPP phase and the converter becomes in the BPP state, the converter cannot be stopped safely and the current of the converter becomes overcurrent that may break the converter in the worst case.

As described above, on a conventional control and protection system of AC-DC conversion system, it is aimed that the converter is stopped safely by attenuating current and voltage in the normal protective operation. In some cases, however, an overcurrent is generated by the BPP operation of the protection sequence and there is the possibility for breaking converter in the worst case.

SUMMARY OF THE INVENTION

Accordingly, one object of this invention is to provide a control and protection system for an AC-DC conversion system having the protection sequence capable of stopping a converter safely without impairing the instantaneous gate block protective function of the inverter.

These and other objects of this invention can be achieved by providing a control and protection system for an AC-DC conversion system for exchanging an electric power between two AC power systems. The AC-DC conversion system is composed of two power converters with DC sides connected to each other and two circuit breakers respectively connected between AC sides of the two power converters and the two AC power systems. Each of the power converters is composed of a plurality of switching devices controlled by a gate signal and converts AC power into DC power or DC power into AC power. The control and protection system is composed of two control and protection units, each of which is provided for one of the power converters, respectively. Each of the control and protection units includes a protection unit for detecting a fault of the power converter to generate a first protection order signal when the fault is detected, and a phase control unit for continuously generating firing pulses to the switching devices of the power converter. Each of the control and protection unit further includes a protection sequence unit connected to the protection unit for receiving the first protection order signal, for holding the first protection order signal, for generating an opening instruction to the circuit breaker, and for generating a second protection order signal for stopping the power converter at another side to the control and protection unit at the another side, while the firing pulses are being supplied to the switching devices of the power converter.

According to one aspect of this invention, there is provided a control and protection system for an AC-DC conversion system for exchanging an electric power between two AC power systems. The AC-DC conversion system is composed of two power converters with DC sides connected to each other and two circuit breakers respectively connected between AC sides of the two power converters and the two AC power systems. Each of the power converters is composed of a plurality of switching devices controlled by a gate signal and converts AC power into DC power or DC power into AC power. The control and protection system is composed of two control and protection units, each of which is provided for one of the power converters, respectively. Each of the control and protection units includes a protection unit for detecting a fault of the power converter to generate a first protection order signal when the fault is detected, and a phase control unit for generating firing pulses to the switching devices of the power converter. Each of the control and protection unit further includes a protection sequence unit connected to the protection unit for receiving the first protection order signal, for holding the first protection order signal, for generating a gate shift instruction, for generating an opening instruction to the circuit breaker, and for generating a second protection order signal for stopping the power converter at another side to the control and protection unit at the another side. The phase control unit is connected to receive the gate shift instruction from the protection sequence unit and generates the firing pulses of a gate shift phase to the switching devices of the power converter after the gate shift instruction is received.

According to this invention, as the by-pass pair operation by the protection sequence is not carried out, even if ground fault of the converter is generated, voltage and current will not become so large as they may break the converter due to the by-pass pair operation. Further, the switching devices controlled by a gate signal can continue the commutation by the phase control means which continuously provides firing pulses to the converter and the AC circuit breakers are opened by the protection sequence means during this period. The converter is put in the by-pass paired state by two main circuit phenomena that AC current crosses the zero point during the commutation period of the converter and that the AC circuit breaker is opened when AC current is at the zero point. Accordingly, even when the control system at the normal side can not receive a protection order signal from the control system at the fault side for some reason, the converter is not put in the inverter instantaneous gate blocked state and therefore, such a defect that may break the converter is not generated.

According to this invention, in addition to the above-described functions, phase of firing pulse is changed to the gate shift phase before opening circuit breaker, and it is therefore possible to attenuate DC current quickly and also, to prevent the failure of commutation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a drawing for explaining an operation of the first embodiment of this invention in modes from the opening of a circuit breaker to the by-pass paired state of the converter;

DETAILED DESCRIPTION OF THE PREFERRED EMBODIMENTS

Figure 1:
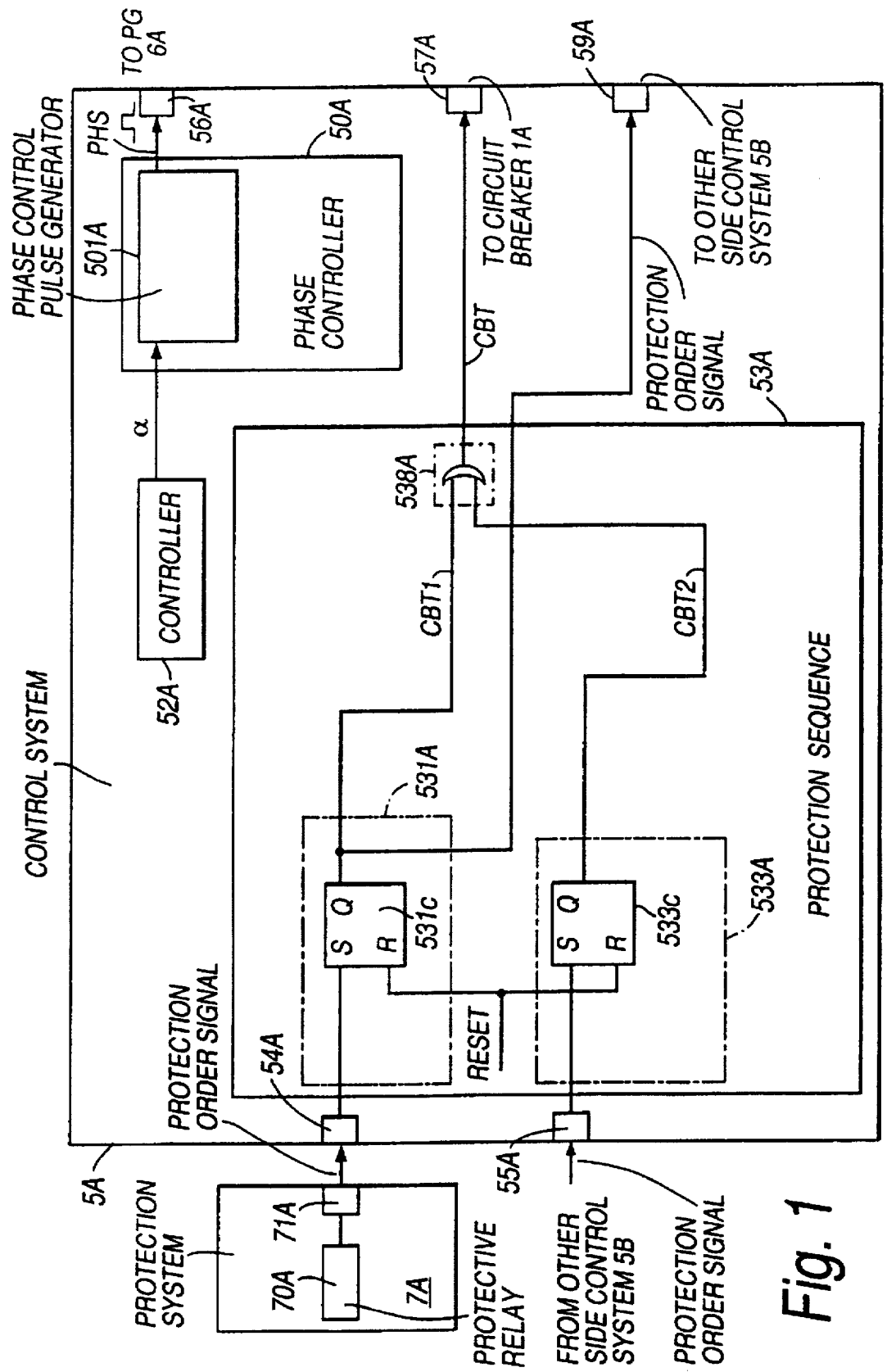
FIG. 1 is a block diagram showing an essential part of a control and protection system for an AC-DC conversion system according to a first embodiment of this invention.

Referring now to the drawings, wherein like reference numerals designate identical or corresponding parts throughout the several views, the embodiments of this invention will be described below.

Figure 2:
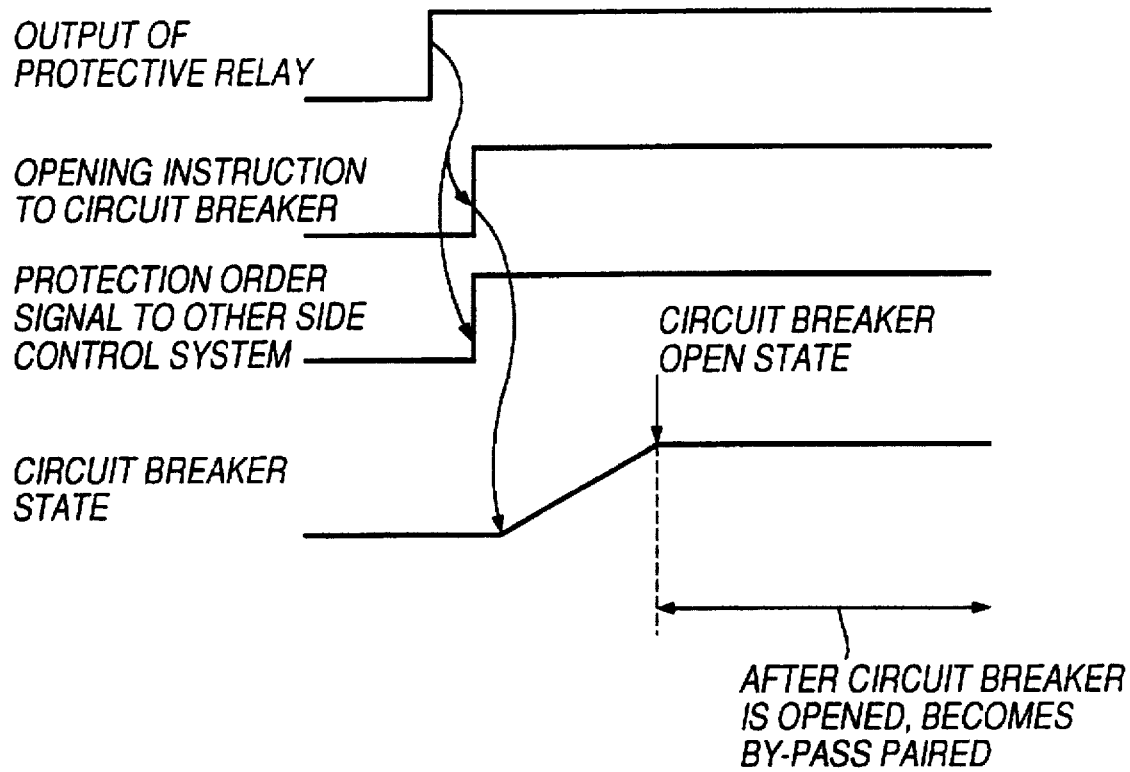
FIG. 2 is a timing chart showing an operation of the first embodiment of this invention.
Figure 22:
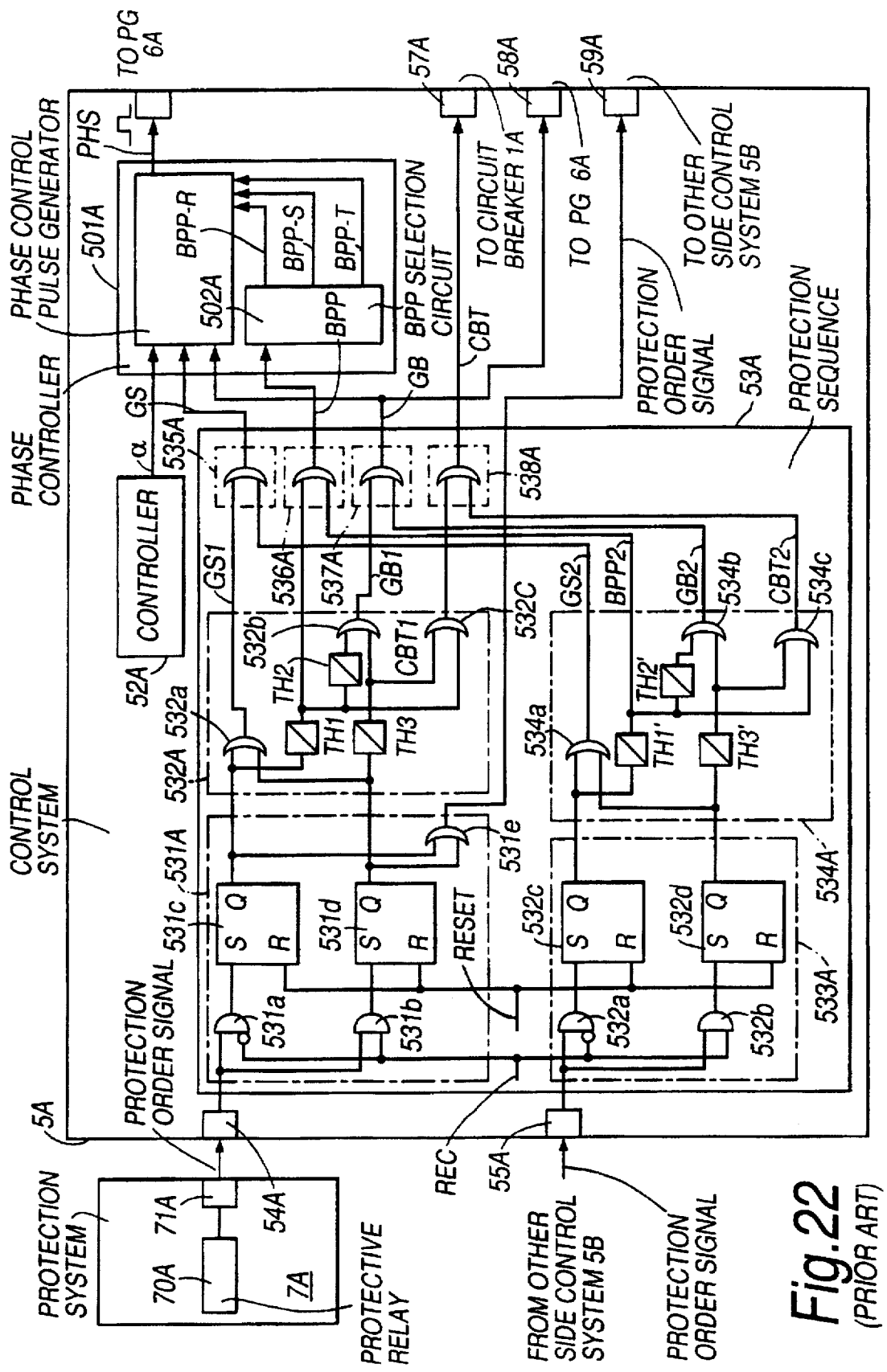
FIG. 22 is a block diagram showing an example of a conventional protection sequence in the control and protection system shown in FIG. 21.
Figure 23:
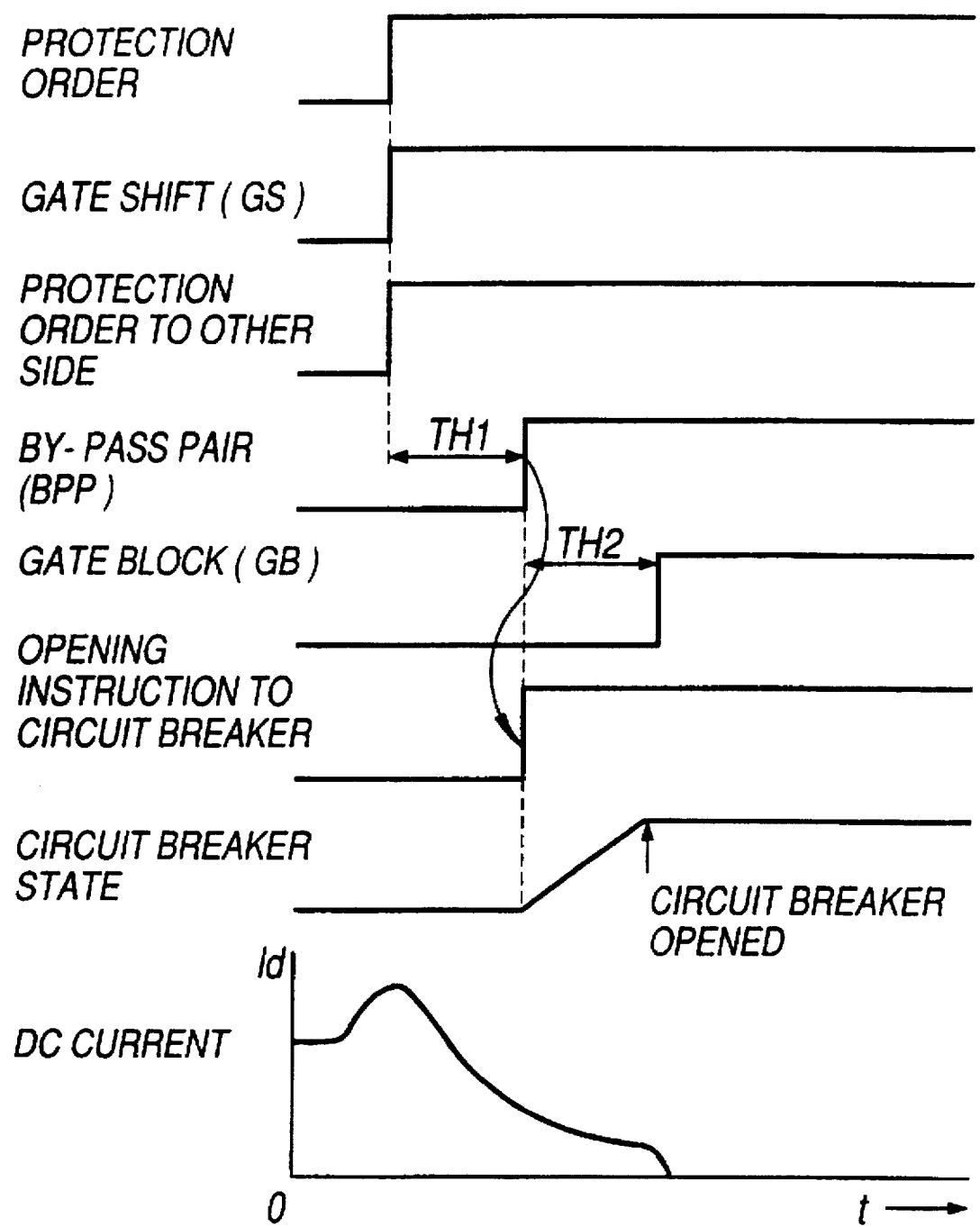
FIG. 23 is a timing chart showing an operation of the conventional control and protection system shown in FIG. 21 in the inverter operation state.
Figure 24:
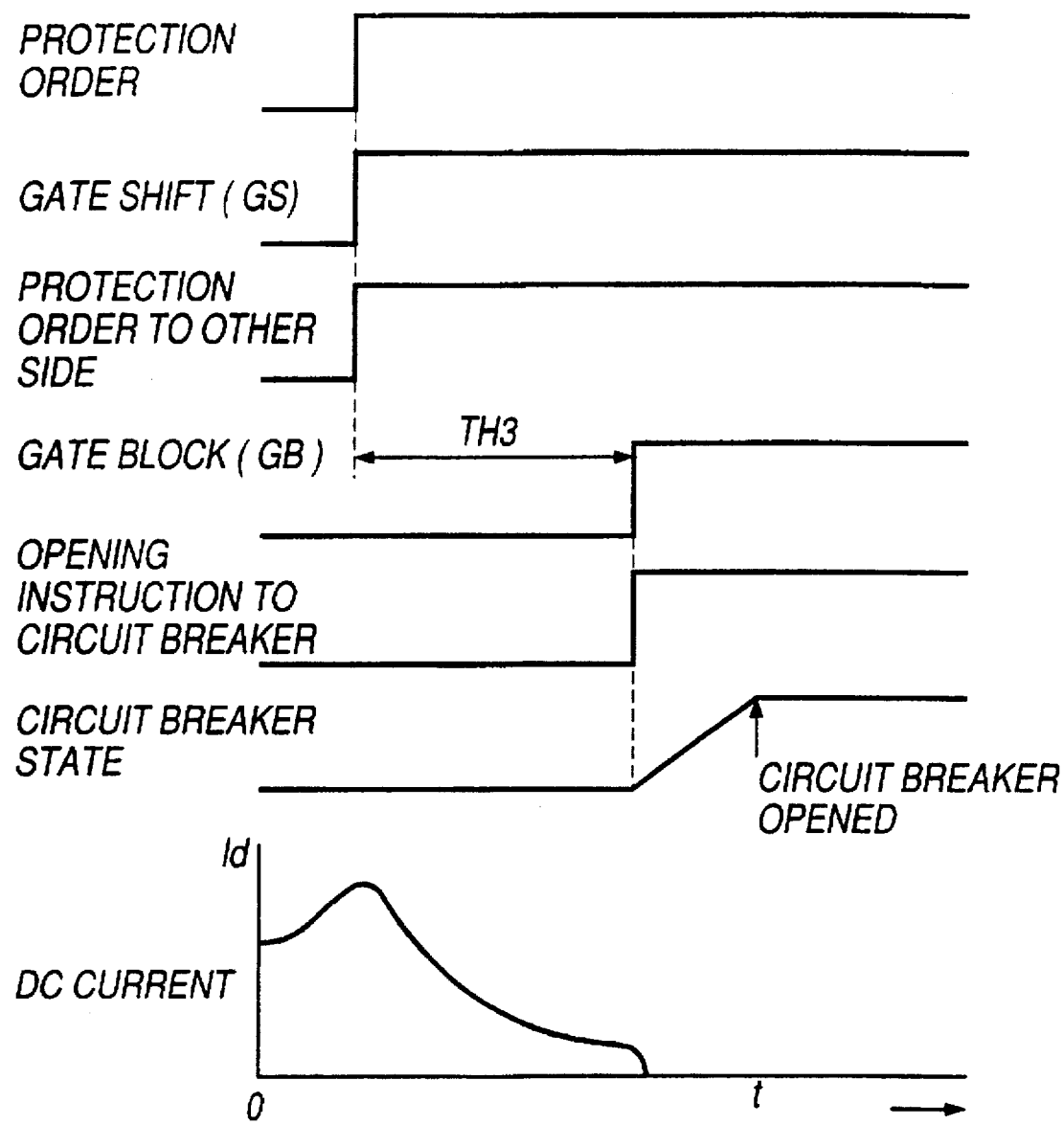
FIG. 24 is a timing chart showing an operation of the conventional control and protection system shown in FIG. 21 in the rectifier operation state.
Figure 25A:
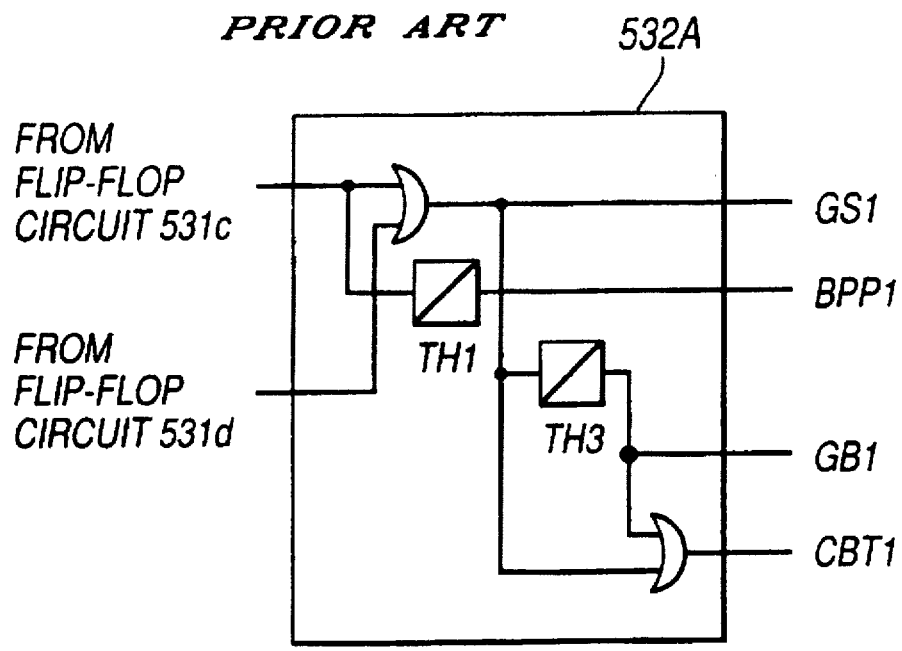
FIG. 25 is a block diagram showing another example of a protective operating timing circuit in the conventional protection sequence shown in FIG. 22.
Figure 25B:
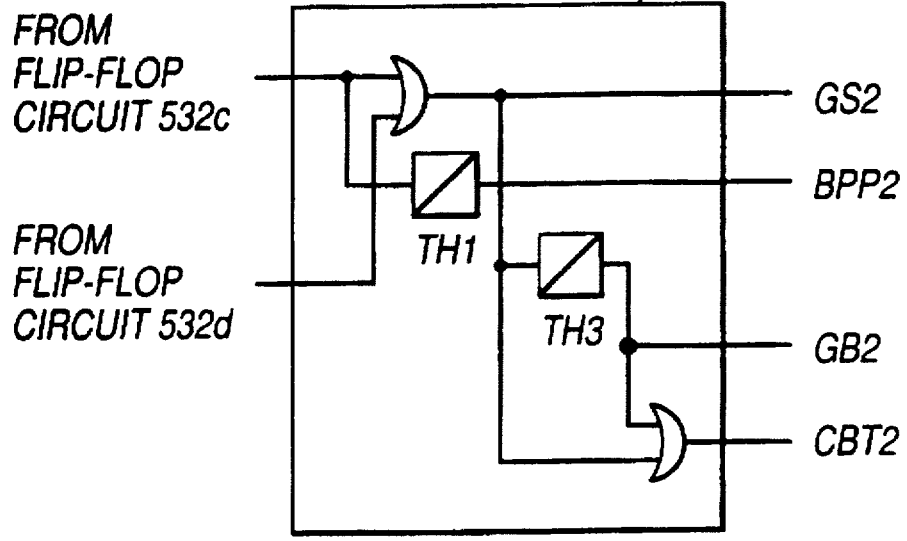
Figure 26:
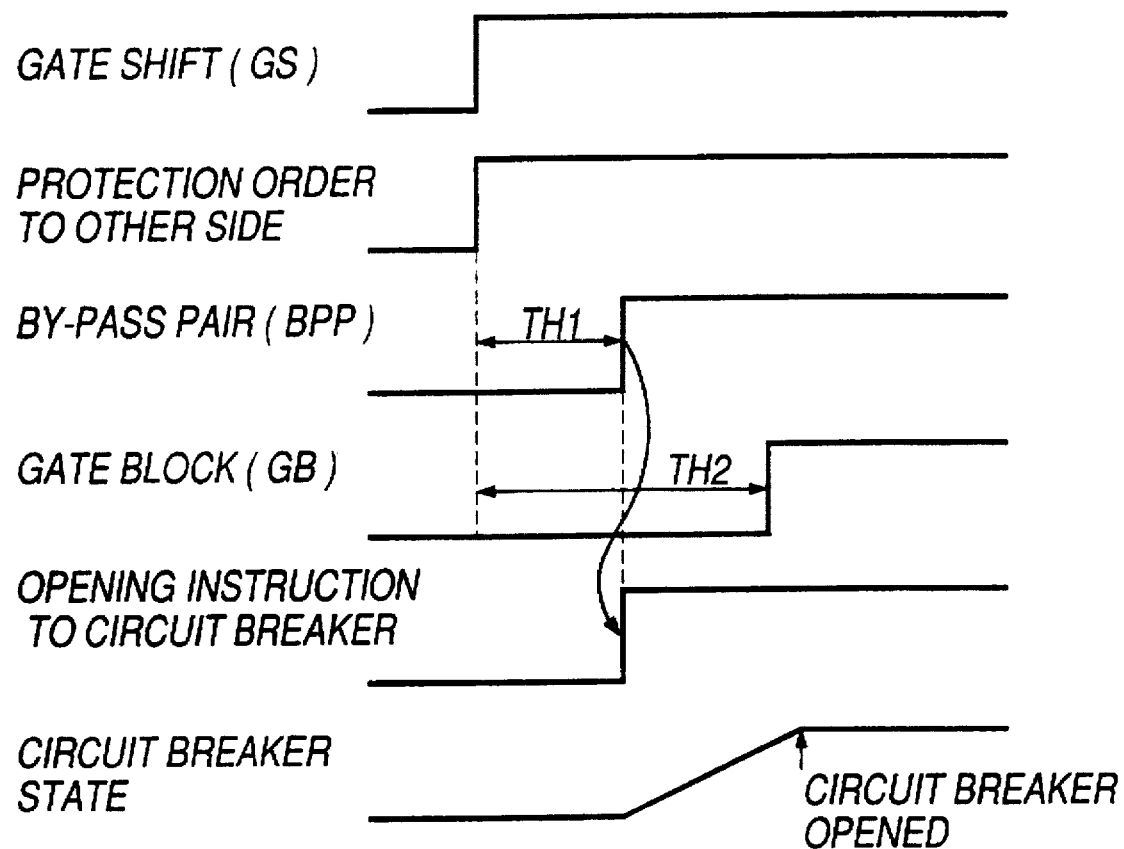
FIG. 26 is a timing chart showing an operation of the conventional control and protection system shown in FIG. 25 in the inverter operation state.
Figure 27A:
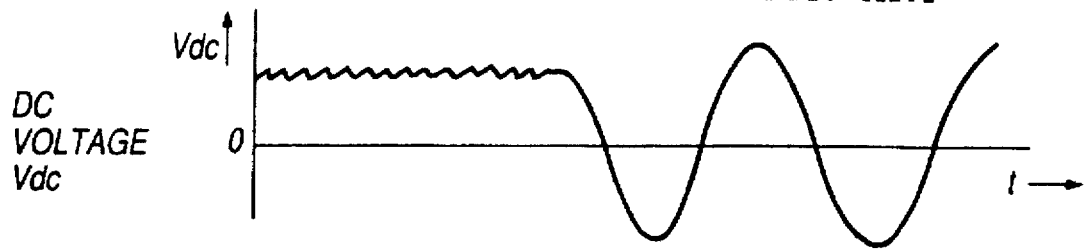
FIG. 27 is a waveform diagram showing current/voltage of each part of the conventional control and protection system in the inverter instantaneous gate blocking.
Figure 27B:
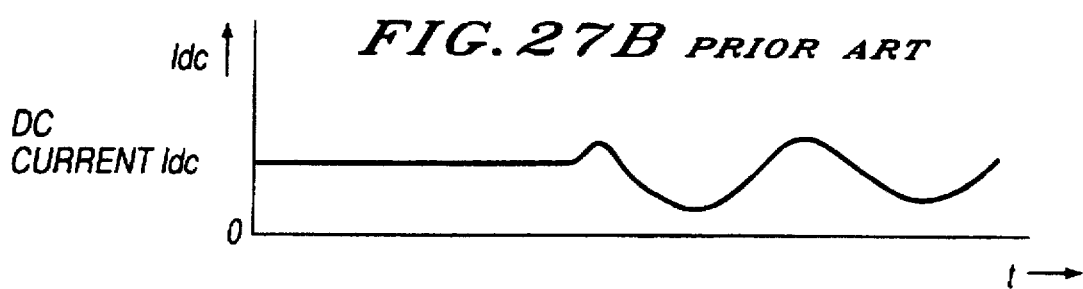
Figure 27C:
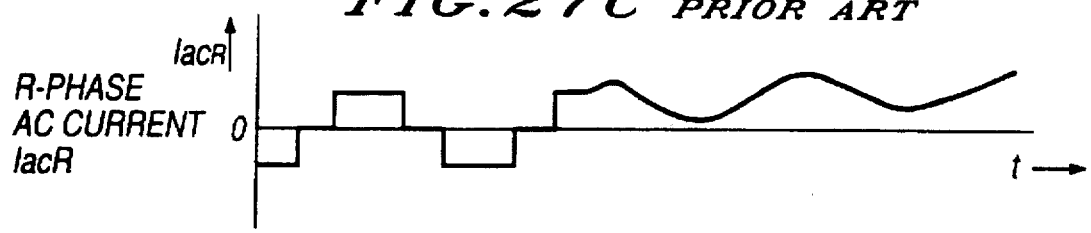
Figure 27D:
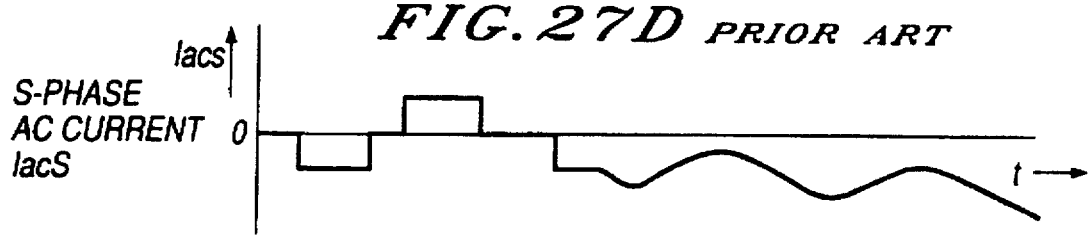
Figure 27E:
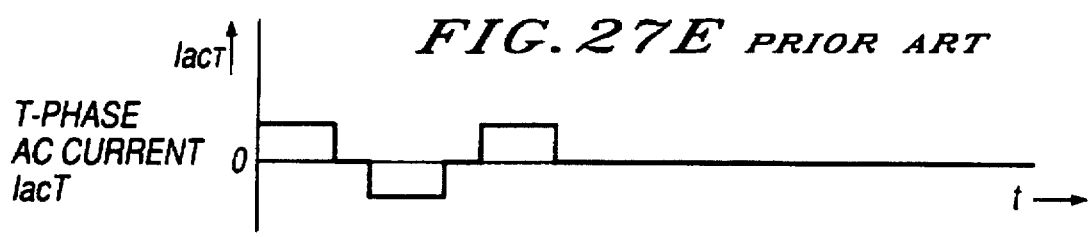
Figure 28:
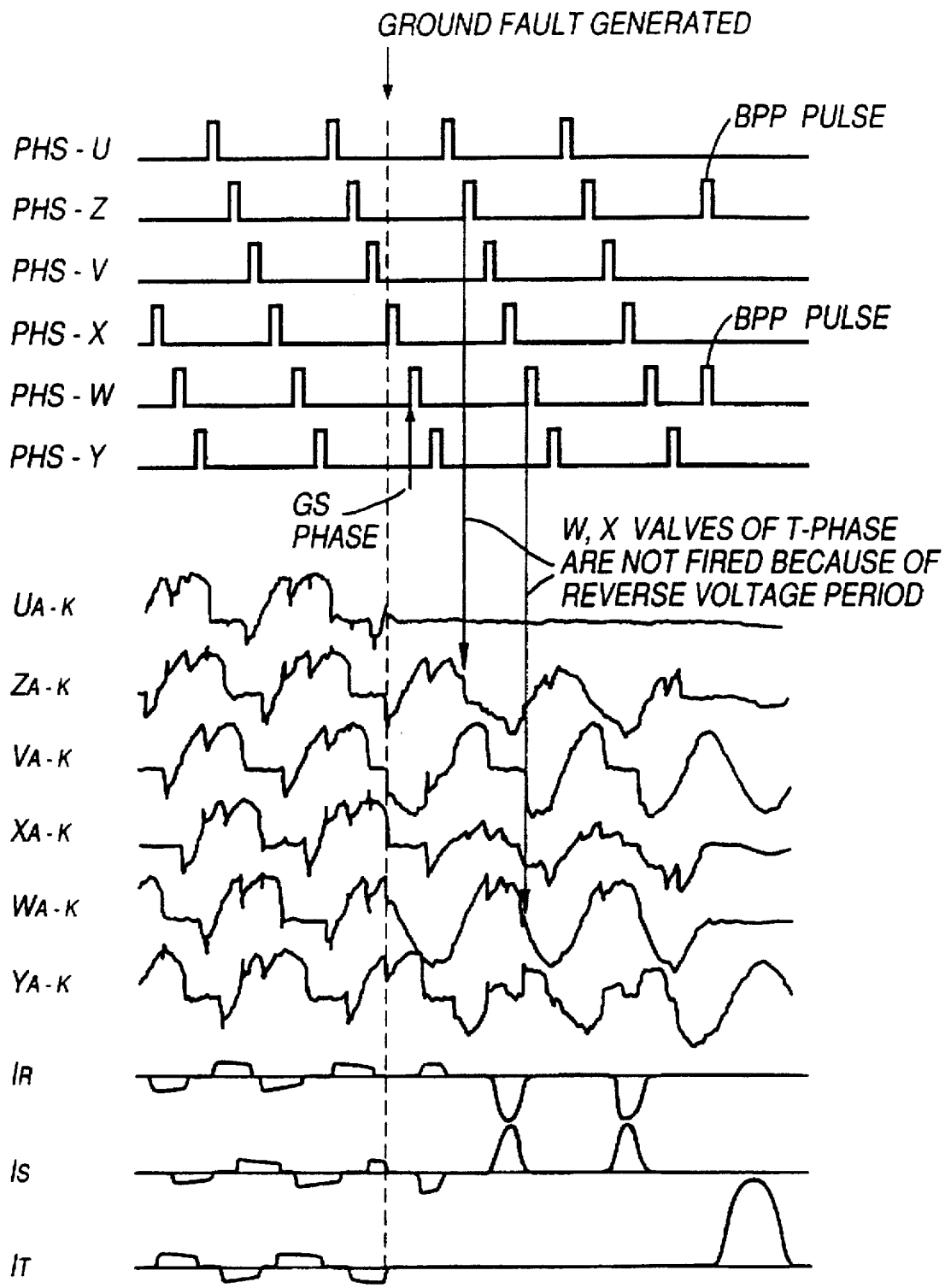
FIG. 28 is a timing chart showing an operation of the conventional control and protection system in case of the converter DC winding ground fault.
Figure 29D:
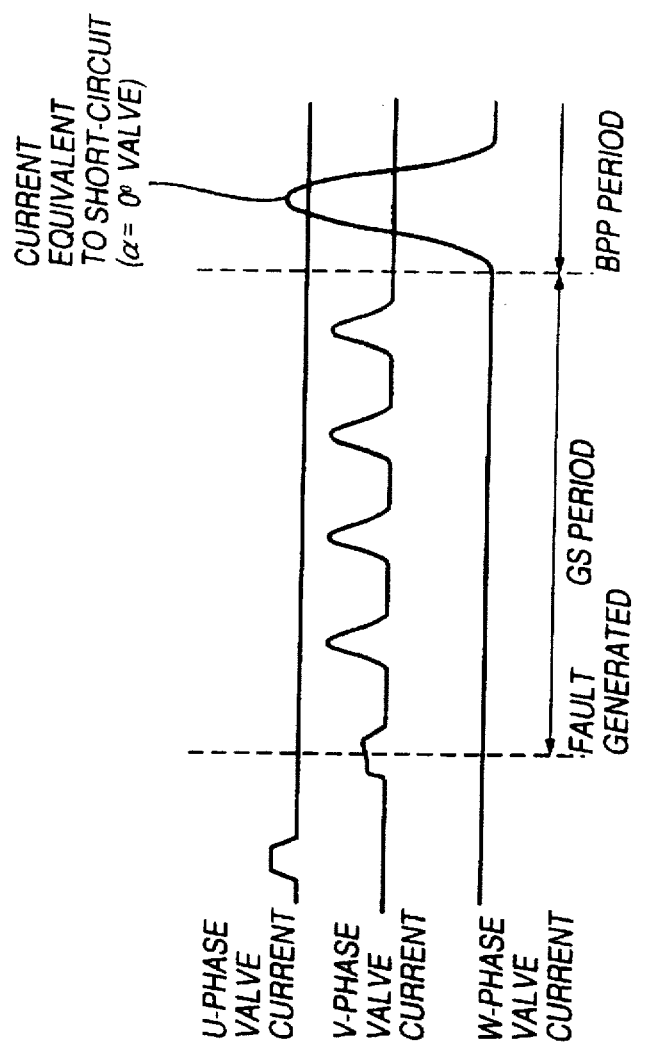
FIG. 29 is a drawing for explaining an operation of the conventional control and protection system in case of the R-phase converter DC winding ground fault when the T-phase is made as BPP-phase.
Figure 29A:
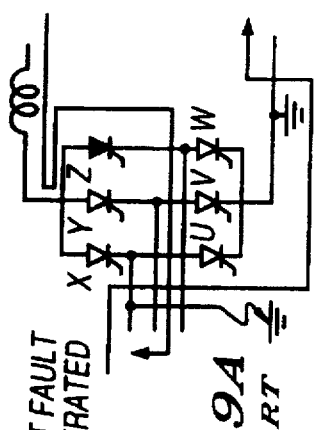
Figure 29B:
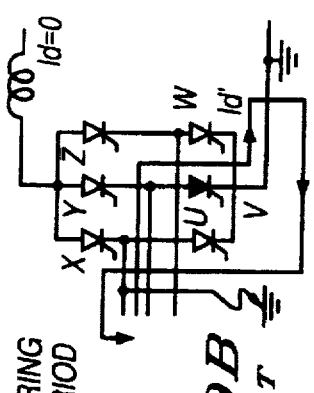
Figure 29C:
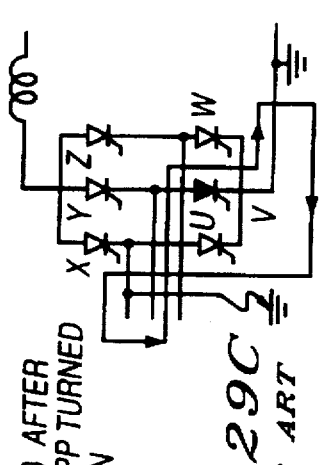
Figure 30D:
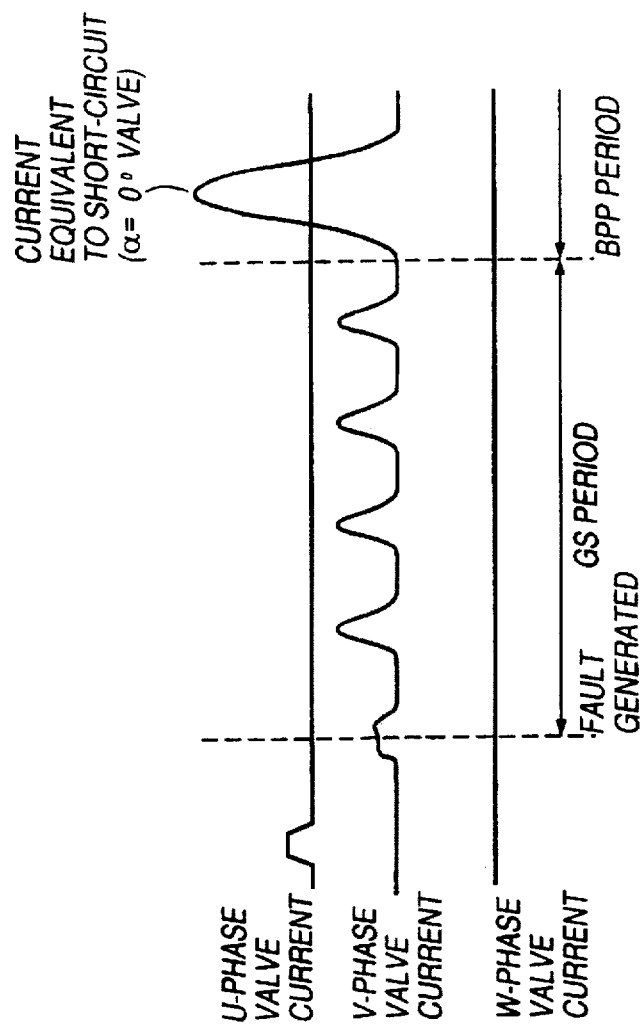
FIG. 30 is a drawing for explaining an operation of the conventional control and protection system in case of the R-phase converter DC winding ground fault when the S-phase is made as BPP-phase.
Figure 30A:
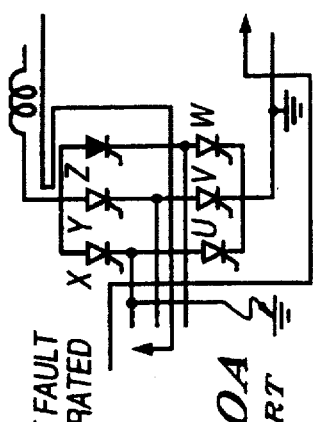
Figure 30B:
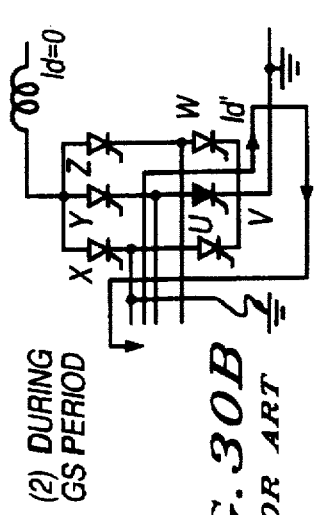
Figure 30C:
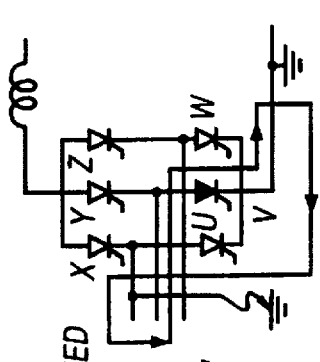
Figure 31D:
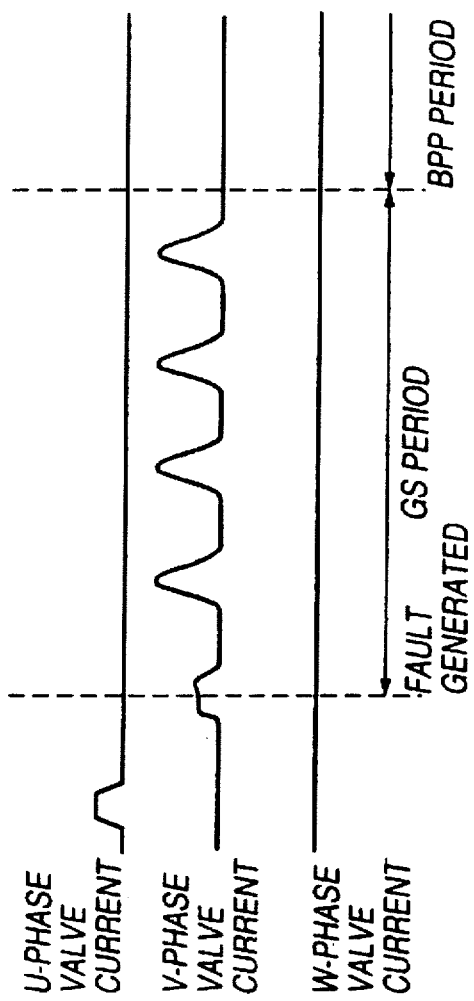
FIG. 31 is a drawing for explaining an operation of the conventional control and protection system in case of the R-phase converter DC winding ground fault when the R-phase is made as BPP-phase.
Figure 31A:
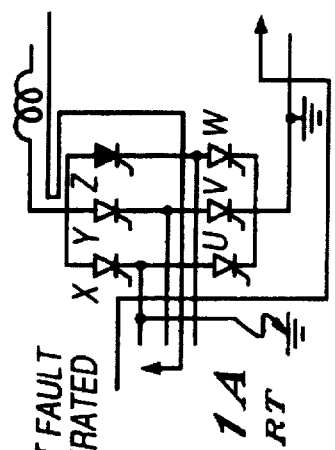
Figure 31B:
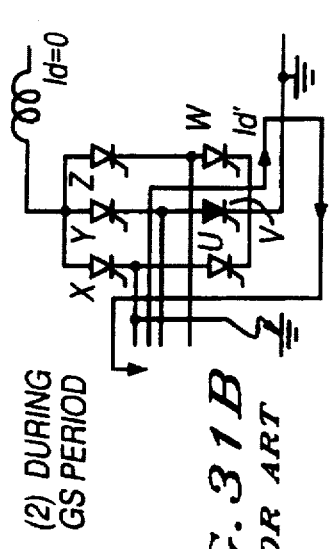
Figure 31C:
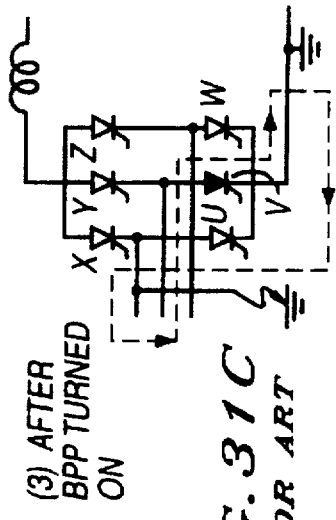

A circuit block diagram showing a control and protection system of an AC-DC conversion system according to a first embodiment of the present invention is shown in FIG. 1, its timing chart diagram is shown in FIG. 2, and its mode diagram until the converter becomes the by-pass paired state after AC circuit breaker is opened is shown in FIG. 3. Further, the same reference numerals are assigned to the same component parts that are shown in FIG. 22. In this embodiment, conventional control system 5A shown in FIG. 22 is substituted by control system 5A shown in FIG. 1.

In FIG. 1, 7A is protection system which detects any fault of converter 3A and is composed of protective relay 70A which detects any fault of converter 3A while monitoring AC current Iac1, AC voltage Vac1, DC current Idc1 and DC voltage Vdc1 and a digital interface circuit 71A which outputs a protection order signal to controls system 5A.

Control system 5A receives the protection order signal from protection system 7A via a digital interface circuit 54A. Control system 5A is composed of protection sequence 53A as protection sequence means to take a timing for the protective operation according to the protection sequence, based on the protection order signal controller 52A to calculate phase control angle α for controlling DC current and DC voltage of converter 3A to a constant level, phase controller 50A as phase control means. Control system 5A is further composed of digital interface circuit 56A to output PHS pulse to PG 6A, digital interface circuit 57A to output opening instruction CBT to circuit breaker 1A and digital interface circuit 59A to output the protection order signal to another side control system 5B. Another side control system 5B according to this embodiment is constructed the same as control system 5A shown in FIG. 1.

If any fault is generated in converter 3A and a protection order signal is input from protection system 7A, control system 5A receives this signal by digital interface circuit 54A and retains the signal by flip-flop circuit 531c in own side protection order signal holding circuit 531A. This retained protection order signal is output to circuit breaker 1A and control system 5B at the other side as open instruction CBT and a protection order signal, respectively from digital interface circuits 57A, 59A. Receiving no protective operating instruction from protection sequence 53A at this time, phase controller 50A continuously outputs PHS pulses with phase control angle α which is the output of controller 52A.

As a result, circuit breaker 1A is opened while the firing pulse is output to converter 3A, and therefore, converter 3A is put in the by-pass paired state as shown in FIG. 2.

When a protection order signal from control system 5B at the other side is input to digital interface circuit 55A of control system 5A, this signal is retained in flip-flop circuit 533c in other side protection order signal holding circuit 533A. The same operation is carried out by other side protection order signal holding circuit 533A likewise the own side protective operation in own side protection order signal holding circuit 531A.

The main circuit operations of converter 3A at this time will be explained using FIG. 3. In FIG. 3, mode (1) shows the operation of converter 3A when the firing pulse is applied to thyristor W after current flowed through thyristors X and V and the current is commutating from thyristor V to thyristor W. At this time, S-phase AC current decreases to zero and T-phase current increases gradually from zero to the magnitude of DC current.

Then, mode (2) shows the operation when current flows through thyristors X and W.

Assume that opening instruction CBT arrives at circuit breaker 1A in mode (2) shown in FIG. 3. Mode (3) is a mode in which current is commutating from thyristors X to Y. In this mode (3), as R-phase AC current decreases to zero as likewise mode (1), R-phase circuit breaker 1R is opened at the timing when current becomes zero. As R-phase circuit breaker 1R is opened at the end of mode (3), even when firing pulse is given to thyristor U hereafter, thyristor U is not fired because AC voltage is zero and current continuously flows to thyristors Y and W.

On the other hand, S-phase and T-phase AC circuit breakers 1S and 1T are not opened as there is no zero point for AC current, and this state is shown in mode (4) in FIG. 3. Then, a state where firing pulse is given to thyristor Z and current is commutating from thyristor Y to thyristor Z is shown in mode (5) in FIG. 3. At this time, as S-phase and T-phase AC currents decrease to zero, the S-phase and T-phase circuit breakers 1S and 1T are opened at the end of mode (5).

After that, as DC current is flowing, current flows through thyristors Z and W of the T-phase, and converter 3A becomes the by-pass paired state as shown in mode (6) in FIG. 3. Control system 5B functions the same as control system 5A, so that the explanation thereof can be omitted.

In FIG. 3, an example where the T-phase is placed in the by-pass paired state is explained. However, as it is clear that R-phase and S-phase respectively become the by-pass paired states according to the timing when circuit breaker opening instruction CBT arrives at circuit breaker 1A and the firing pulse timing, the explanation of these cases can be omitted here. Accordingly, even when such a defect is generated that the control system at the normal side does not receive a protection order signal from the fault side, firing pulses are continuously given to the converter and the AC circuit breaker is opened during this period, and therefore, the converter becomes the by-pass paired state and the inverter instantaneous gate block does not occur. Further, though the converter becomes by-pass paired state as the by-pass paired operation as in the convention control and protection system is not carried out, overvoltage and overcurrent by the by-pass paired operation do not result when converter is in any faults. Thus, the system has the function to achieve the operation to safely stop the converter without damaging it.

If it is strictly described, own side protection order signal holding circuit 531A outputs signal CBT1 with a suffix 1, and other side protection order signal holding circuit 533A outputs signal CBT2 with a suffix 2. Protection sequence 53A is further provided with OR circuit 538A. Signals CBT1 and CBT2 are input to OR circuit 538A, which outputs signal CBT to circuit breaker 1A via digital interface circuit 57A.

Modifications of the first embodiment described above are shown in FIGS. 4 and 5.

Figure 4:
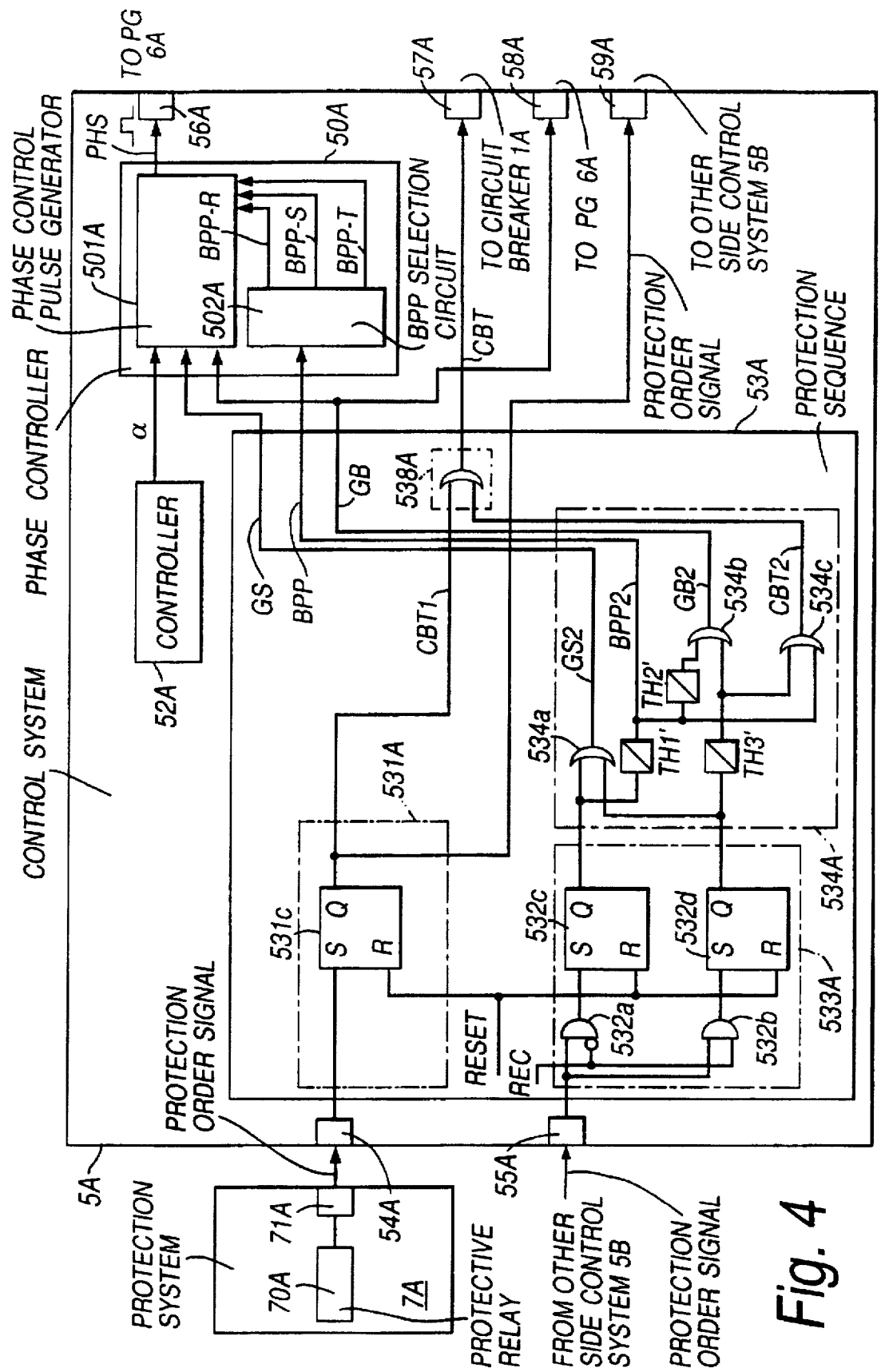
FIG. 4 is a block diagram showing an essential part of a control and protection system for an AC-DC conversion system according to a modification of the first embodiment of this invention.

FIG. 4 shows a modification in which the protection sequence is carried out to output opening instruction CBT to circuit breaker 1A while firing pulses are being continuously output only when a protection order signal is received from protection system 7A and when a protection order signal is received from control system 5B at the other side, the conventional protection sequence similar to that shown in FIG. 22 is executed.

Figure 5:
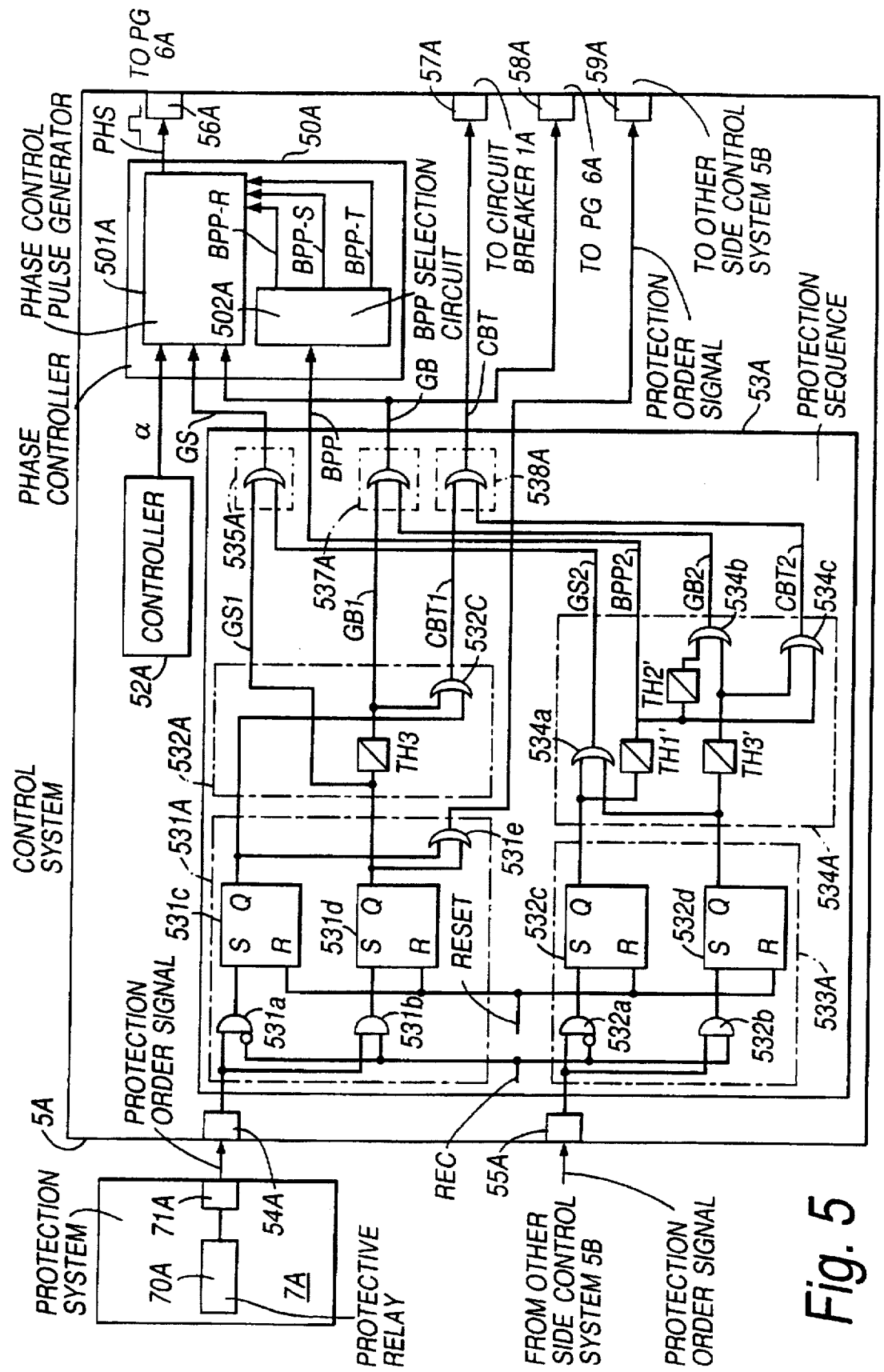
FIG. 5 is a block diagram showing an essential part of a control and protection system for an AC-DC conversion system according to another modification of the first embodiment of this invention.

Further, FIG. 5 shows another modification in which the protection sequence is carried out to output opening instruction CBT to circuit breaker 1A while firing pulses are continuously being output only when converter 3A is in the inverter state and a protection order signal is received from protection system 7A.

In this modification, when converter 3A is in the rectifier state and a protection order signal is received from protection system 7A or a protection order signal is received from control system 5B at the other side, the conventional protection sequence similar to that shown in FIG. 22 is executed.

As shown above, the effect of this invention has the feature especially in the protection operation while the system is in operation in the inverter state when an own side protection order signal is generated (that is, when a fault is generated at the own side).

As for the case when the system is in operation in the rectifier state and an own side protection order signal is generated or the case when a protection order signal is generated at the other side, the system constructed with the above-described protection sequence of the first embodiment of this invention has the same effect as the system constructed with the conventional protection sequence as shown in FIG. 22.

Further, in the embodiment shown in FIG. 1, the system is in such the structure that protection order signal holding circuits 531A and 533A are provided in control system 5A, but it is clear that the same effect is obtained even when they are provided in either protection system 7A or PG 6A.

Figure 6:
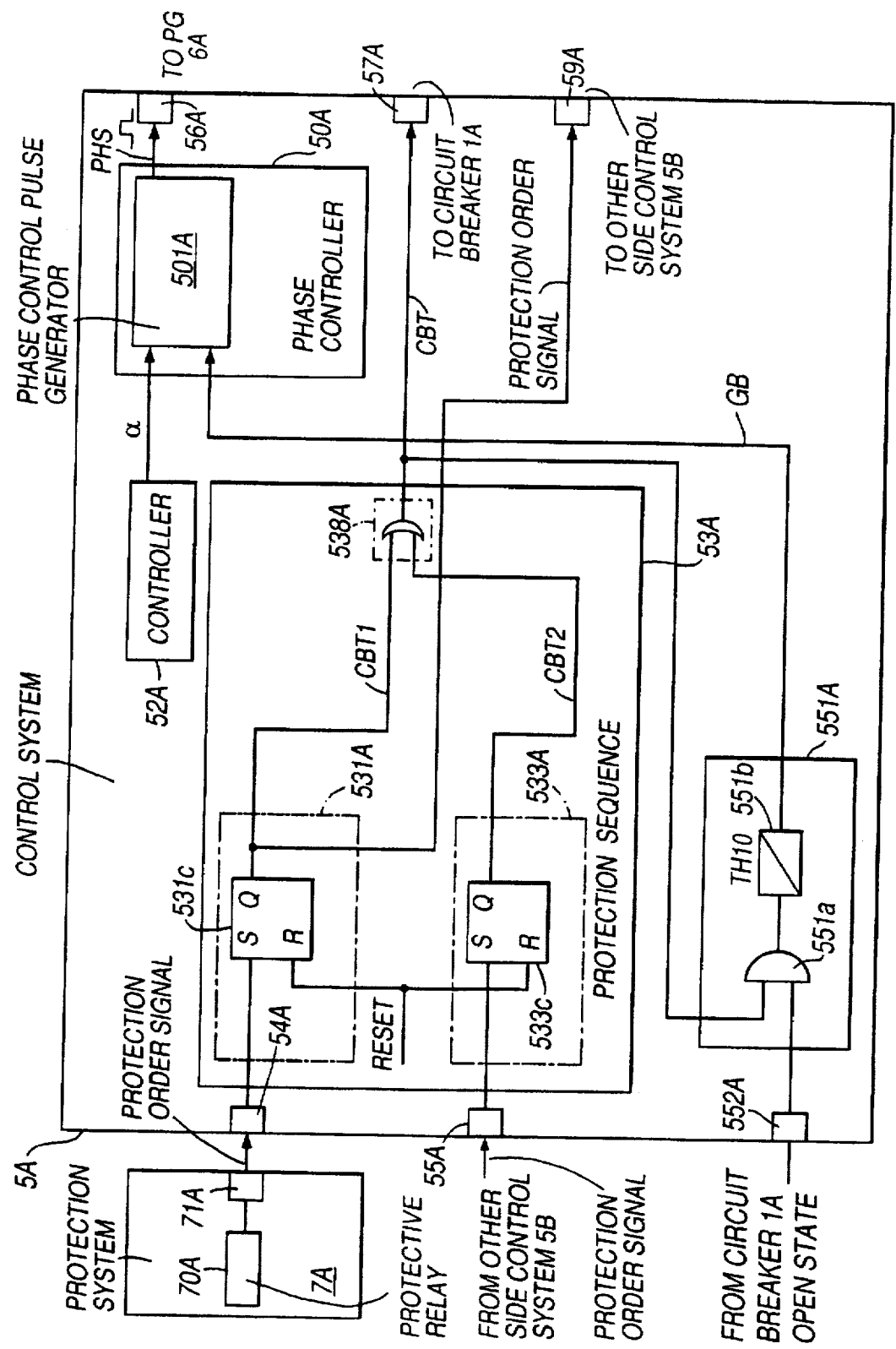
FIG. 6 is a block diagram showing an essential part of a control and protection system for an AC-DC conversion system according to a second embodiment of this invention.

FIG. 6 is a block diagram showing the construction of a second embodiment of the present invention.

Needless to say, in this embodiment it is also possible to provide the construction shown in the block diagrams of the modifications of the first embodiment shown in FIGS. 4 and 5, it will be omitted here for making the explanation simple.

Figure 7:
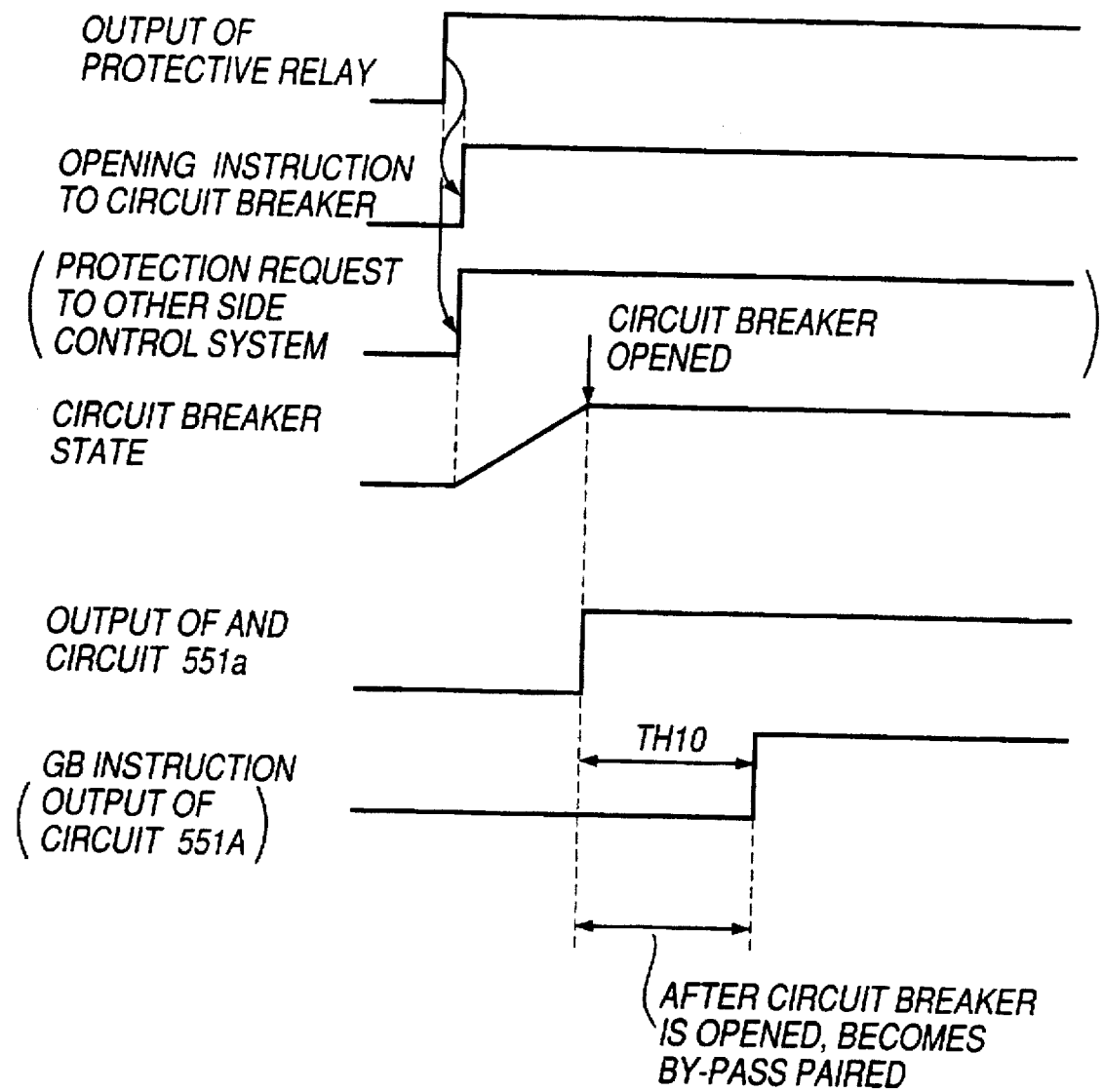
FIG. 7 is a timing chart showing an operation of the second embodiment of this invention.

In the second embodiment, the system is in such the construction that in addition to the construction of the first embodiment shown in FIG. 1, a circuit breaker state detector 551A as gate block means and a digital interface circuit 552A are newly added. A protection order signal is held by own side protection order signal holding circuit 531A and then opening instruction CBT is output to circuit breaker 1A. After that, when an open state signal is received from circuit breaker 1A, gate block instruction GB is output to phase controller 50A from an on-delay timer 551b at an on-delay time TH10 after the open state signal is received. The timing chart at this state is shown in FIG. 7.

Accordingly, if the system is constructed as the second embodiment, the same action and effect as the first embodiment are obtained. In addition, as firing pulses are gate blocked by the circuit breaker open state signal, the converter is never operated even when the circuit breaker is turned ON unnecessarily.

Figure 8:
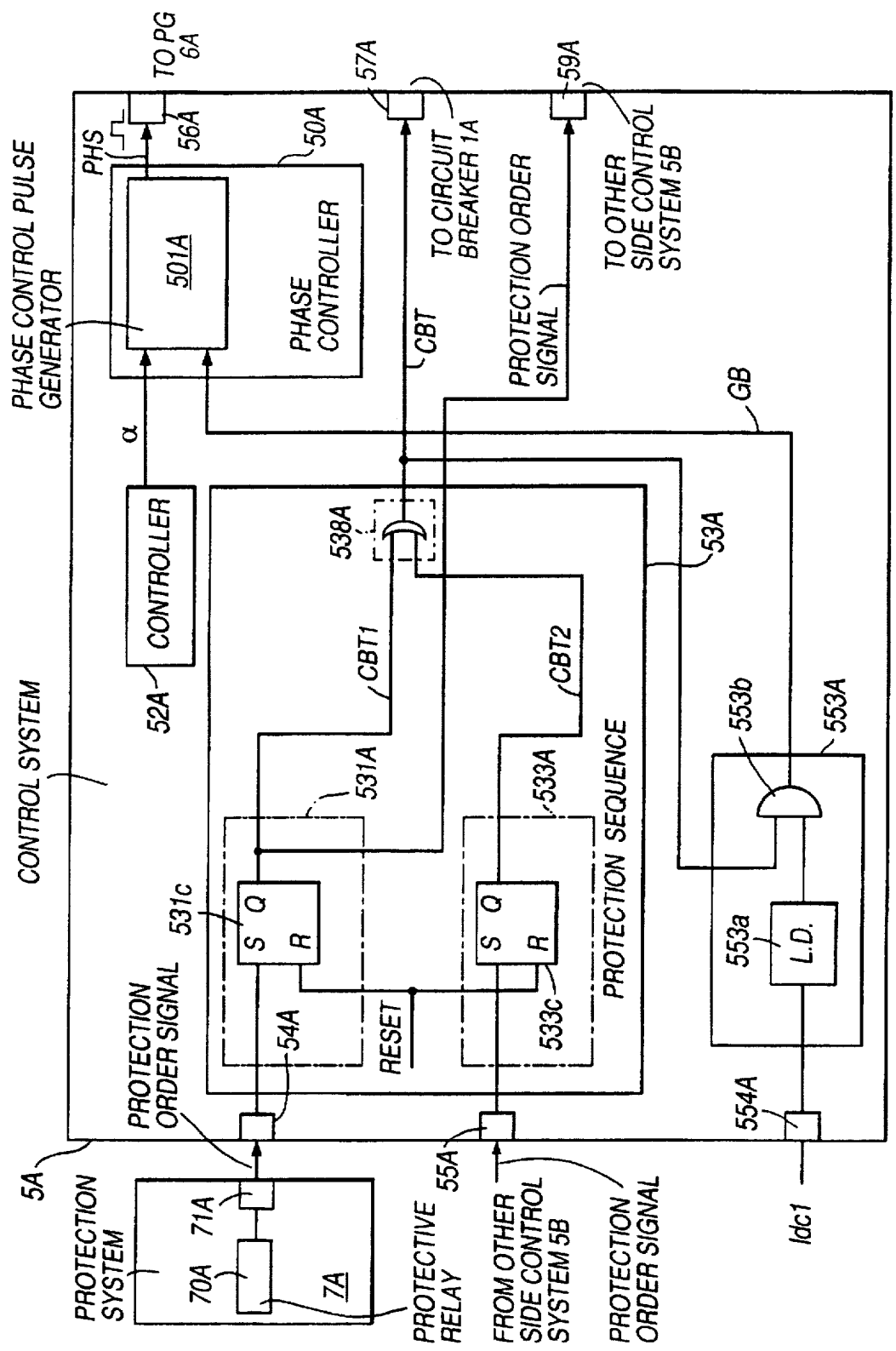
FIG. 8 is a block diagram showing an essential part of a control and protection system for an AC-DC conversion system according to a third embodiment of this invention.

FIG. 8 is a block diagram showing the construction of a third embodiment of the present invention.

Needless to say, in this embodiment although it is also possible to provide the construction shown in the block diagrams of the modifications of the first embodiment shown in FIGS. 4 and 5, it will be omitted here for making the explanation simple.

Figure 9:
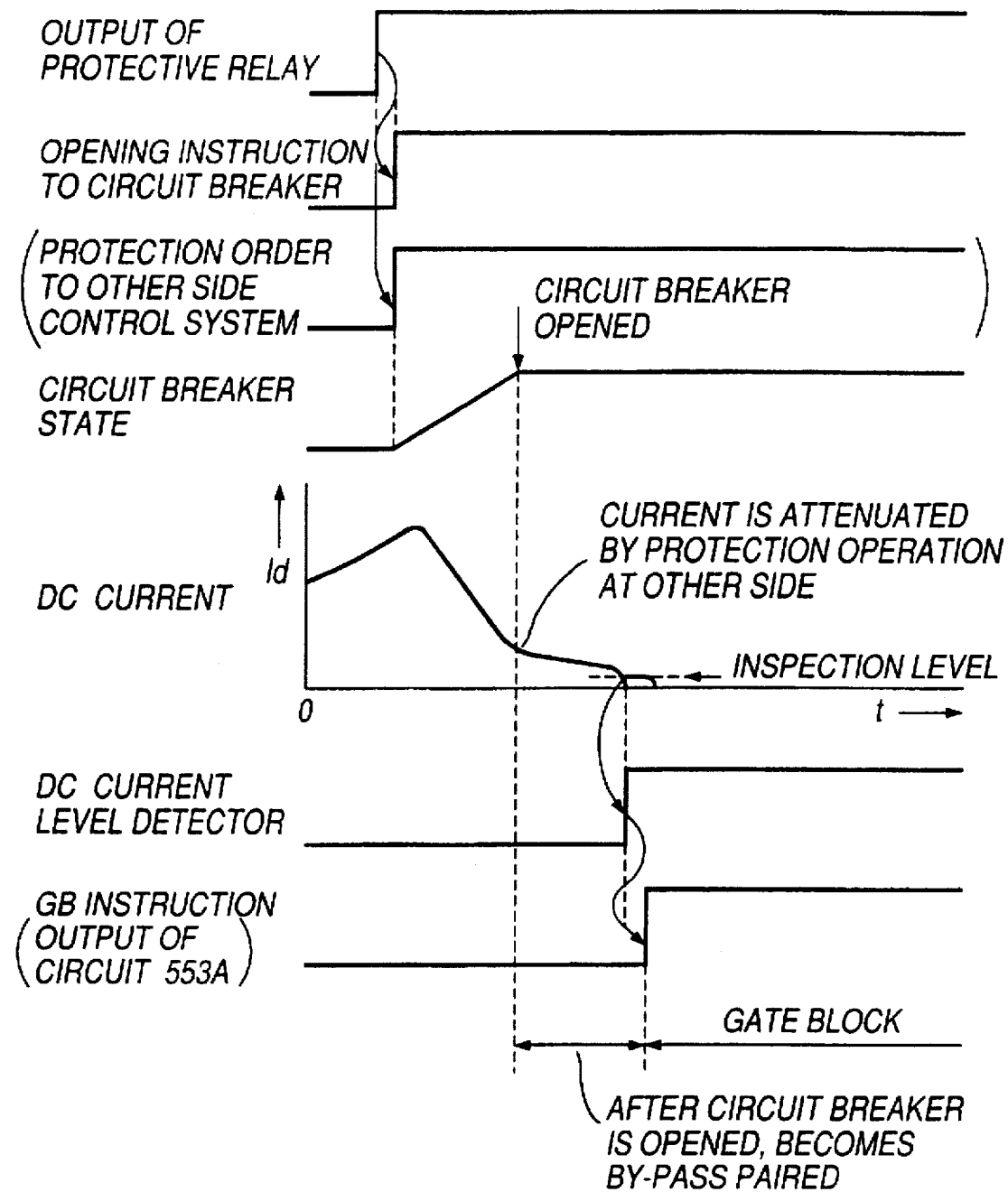
FIG. 9 is a timing chart showing an operation of the third embodiment of this invention.

In the third embodiment, the system is in such the construction that in addition to the construction of the first embodiment shown in FIG. 1, a DC current state detector 553A and a digital interface circuit 554A are newly added. A protection order signal is held by own side protection order signal holding circuit 531A and then opening instruction CBT is output to circuit breaker 1A. After that gate blocking instruction GB is output to phase controller 50A under the condition that DC current Idc1 drops to below a current value set by a level detector 553a. The timing chart at this state is shown in FIG. 9.

Accordingly, if the system is constructed as the third embodiment, the same action and effect as the first embodiment are obtained. In addition, as firing pulses are gate blocked after DC current is attenuated to below a fixed value, the converter is never operated even when the circuit breaker is unnecessarily turned ON. Furthermore, as the gates are blocked after current becomes sufficiently small and the thyristor valves composing the converter are turned OFF, it is possible to stop the converter more safely.

Figure 10:
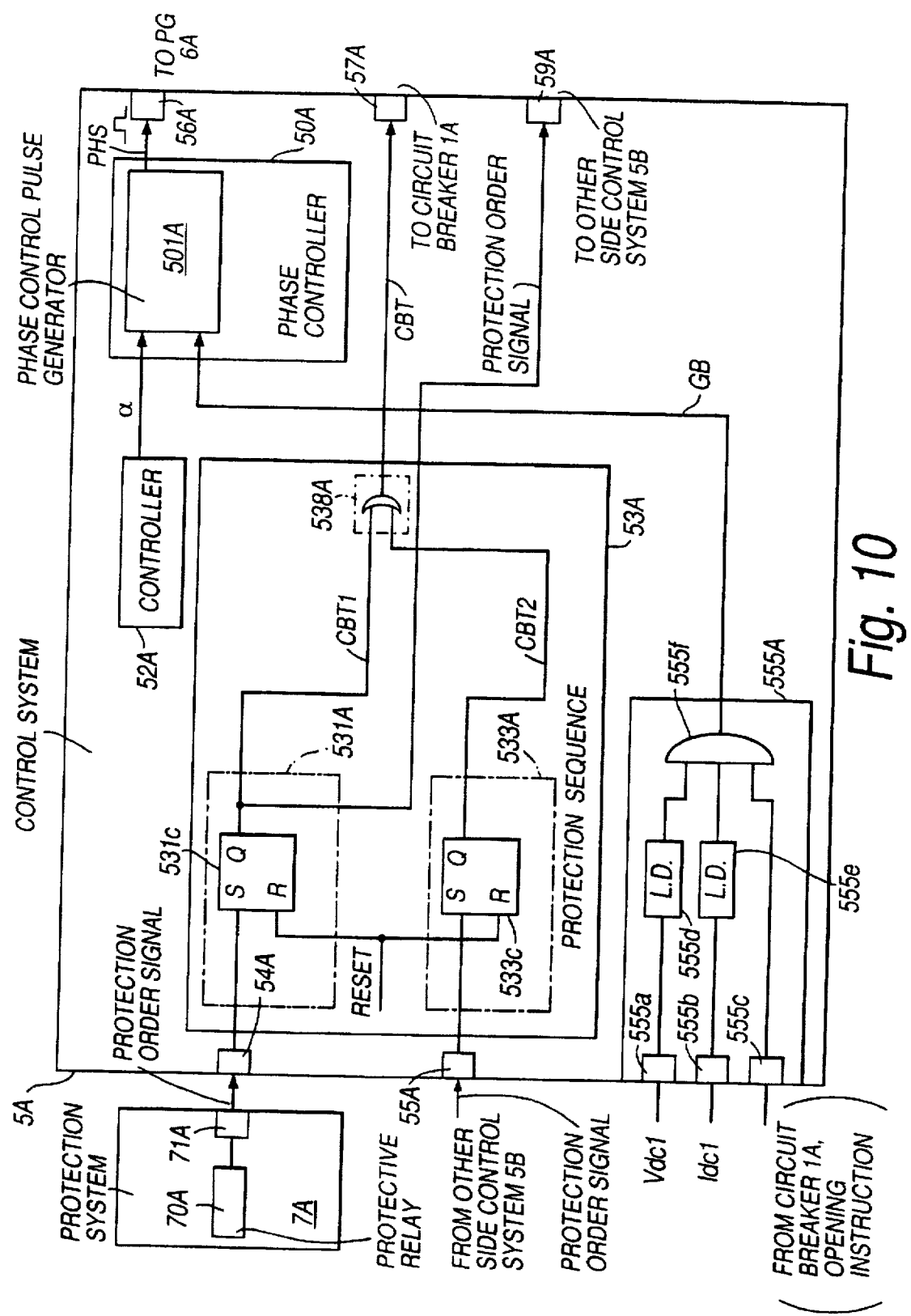
FIG. 10 is a block diagram showing an essential part of a control and protection system for an AC-DC conversion system according to a fourth embodiment of this invention.

FIG. 10 is a block diagram showing the construction of a fourth embodiment of the present invention.

Needless to say, in this embodiment although it is also possible to provide the construction shown in the block diagrams of the modifications of the first embodiment shown in FIGS. 4 and 5, it will be omitted here for making the explanation simple.

Figure 11:
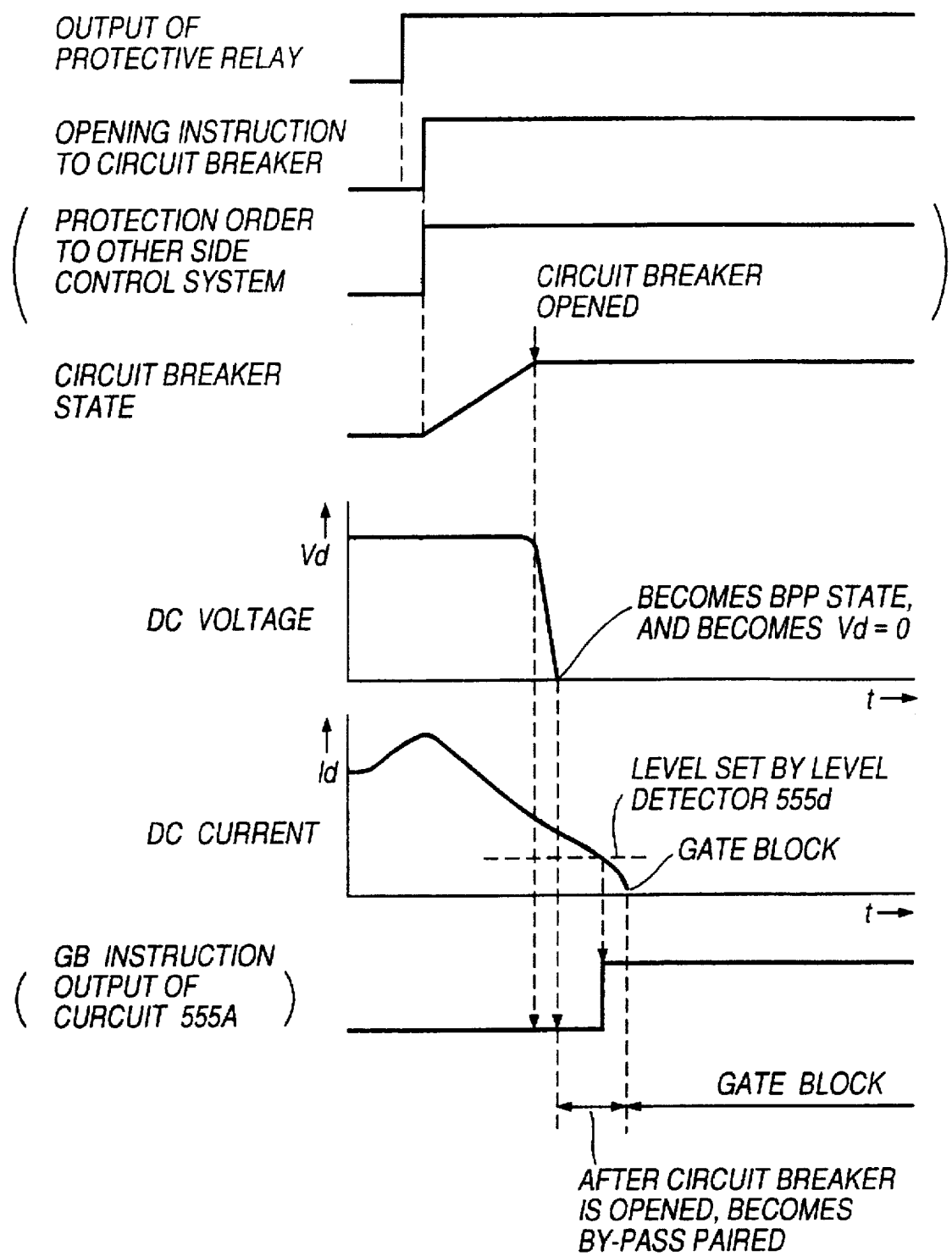
FIG. 11 is a timing chart showing an operation of the fourth embodiment of this invention.

In the fourth embodiment, the system is in such the construction that in addition to the construction of the first embodiment shown in FIG. 1, a by-pass paired state detector 555A as by-pass paired detecting means is newly added. A protection order signal is held by own side protection order signal holding circuit 531A and then opening instruction CBT is output to circuit breaker 1A. After that, when circuit breaker 1A is in the open state, gate blocking instruction GB is output to phase controller 50A by detecting that converters 3A is in the by-pass paired state under the condition that DC voltage Vdc1 is zero voltages set by a level detector 555d and DC current Idc1 drops to below a current value set by a level detector 555e. The timing chart at this state is shown in FIG. 11. Further, as another embodiment of by-pass paired state detector 555A, there is such a method to detect the by-pass paired state by detecting that current is flowing simultaneously through series connected thyristor valves based on detecting current flowing through the thyristor valves of the converter.

Accordingly, if the system is constructed as the fourth embodiment, the same action and effect as the first embodiment are obtained. In addition, as firing pulses are gate blocked after detecting the by-pass paired state by the means for detecting that the converter is in the by-pass paired state, the converters is never operated when the circuit breaker is unnecessarily turned ON. Furthermore, as the gate blocking is made after the converter is put in the by-pass paired state, it is possible to prevent the inverter gate blocking more certainly.

Figure 12:
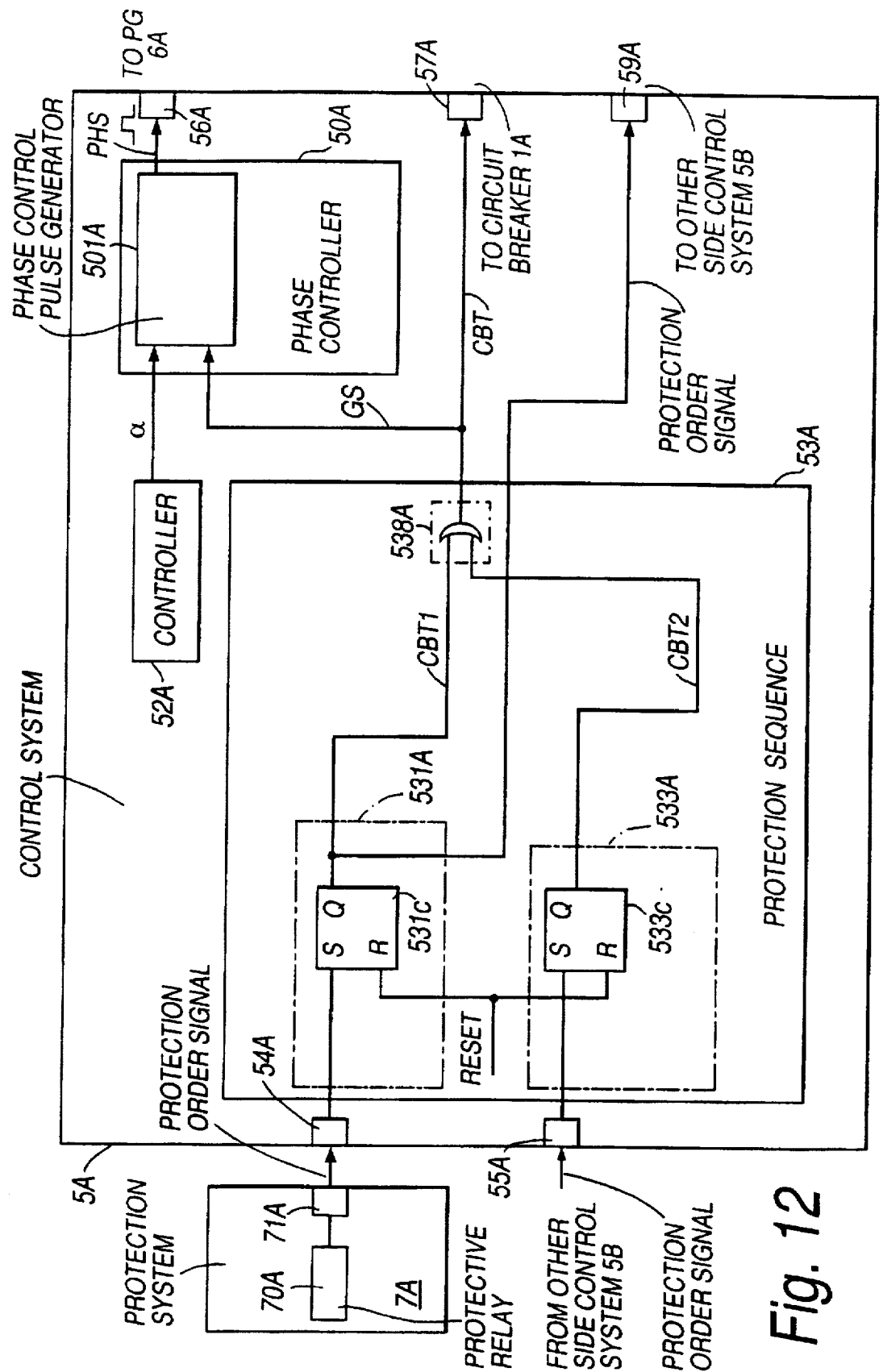
FIG. 12 is a block diagram showing an essential part of a control and protection system for an AC-DC conversion system according to a fifth embodiment of this invention.

FIG. 12 is a block diagram showing the construction of a fifth embodiment of the present invention.

Needless to say, in this embodiment although it is possible to provide the construction shown in the block diagrams of the modifications of the first embodiment shown in FIGS. 4 and 5, it will be omitted here for making the explanation simple.

Figure 13:
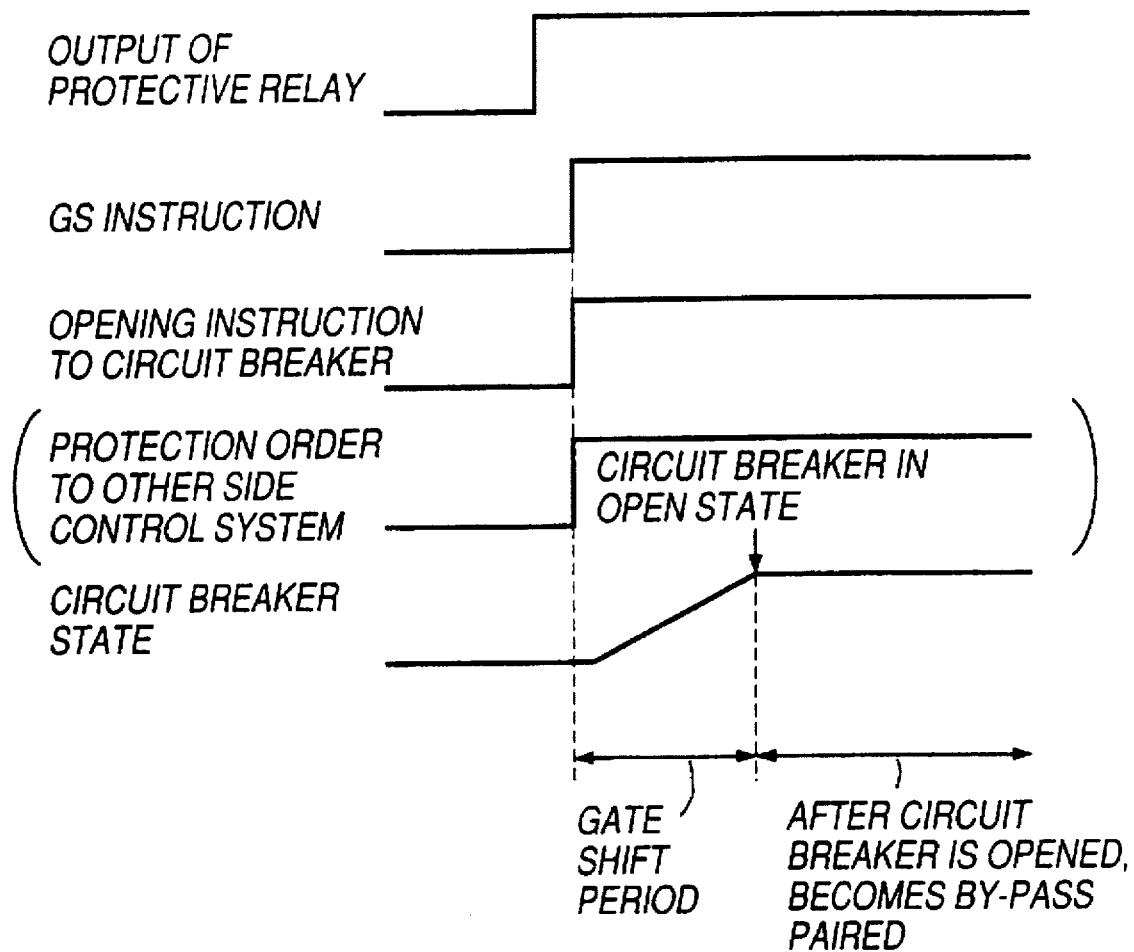
FIG. 13 is a timing chart showing an operation of the fifth embodiment of this invention.

In the fifth embodiment, the system is in such the construction that in addition to the construction of the first embodiment shown in FIG. 1, gate shift instruction GS is output from protection sequence 53A as protection sequence means to phase controller 50A. A protection order signal is held by own side protection order signal holding circuit 531A and then opening instruction CBT is output to circuit breaker 1A, and at the same time gate shift instruction GS is output to phase controller 50A. DC current is attenuated quickly by this gate shift operation. The timing chart at this state is shown in FIG. 13.

Accordingly, if the system is constructed as the fifth embodiment, the same action and effect as the first embodiment are obtained. In addition, as the phase of firing pulse is made to the gate shift phase before opening the circuit breaker, it is possible to attenuate DC current quickly and prevent failure of commutation.

Figure 14:
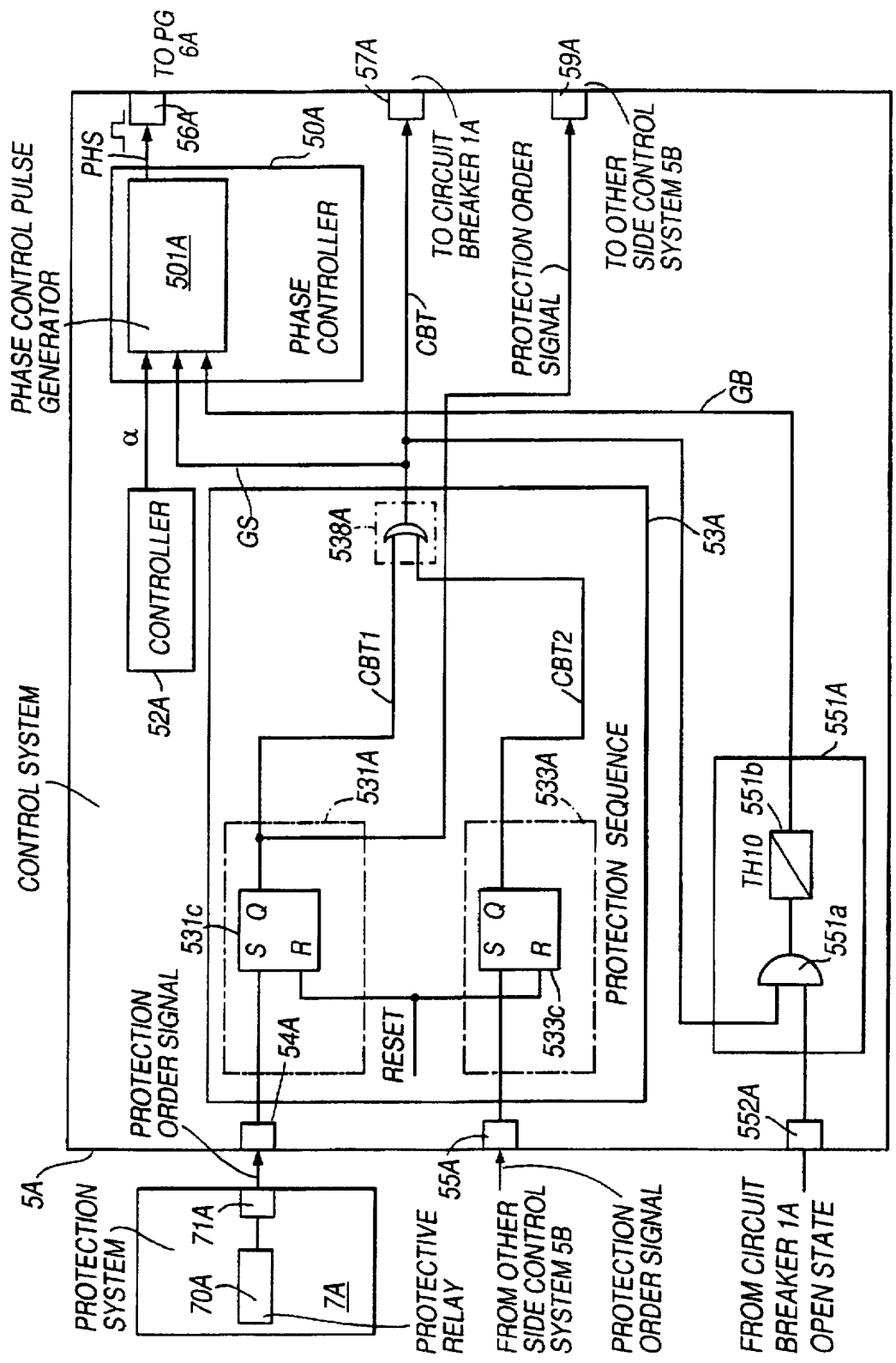
FIG. 14 is a block diagram showing an essential part of a control and protection system for an AC-DC conversion system according to a sixth embodiment of this invention.

FIG. 14 is a block diagram showing the construction of a sixth embodiment of the present invention.

Needless to say, in this embodiment although it is possible to provide the construction shown in the block diagrams of the modification of the first embodiment shown in FIGS. 4 and 5, it will be omitted here for making the explanation simple.

Figure 15:
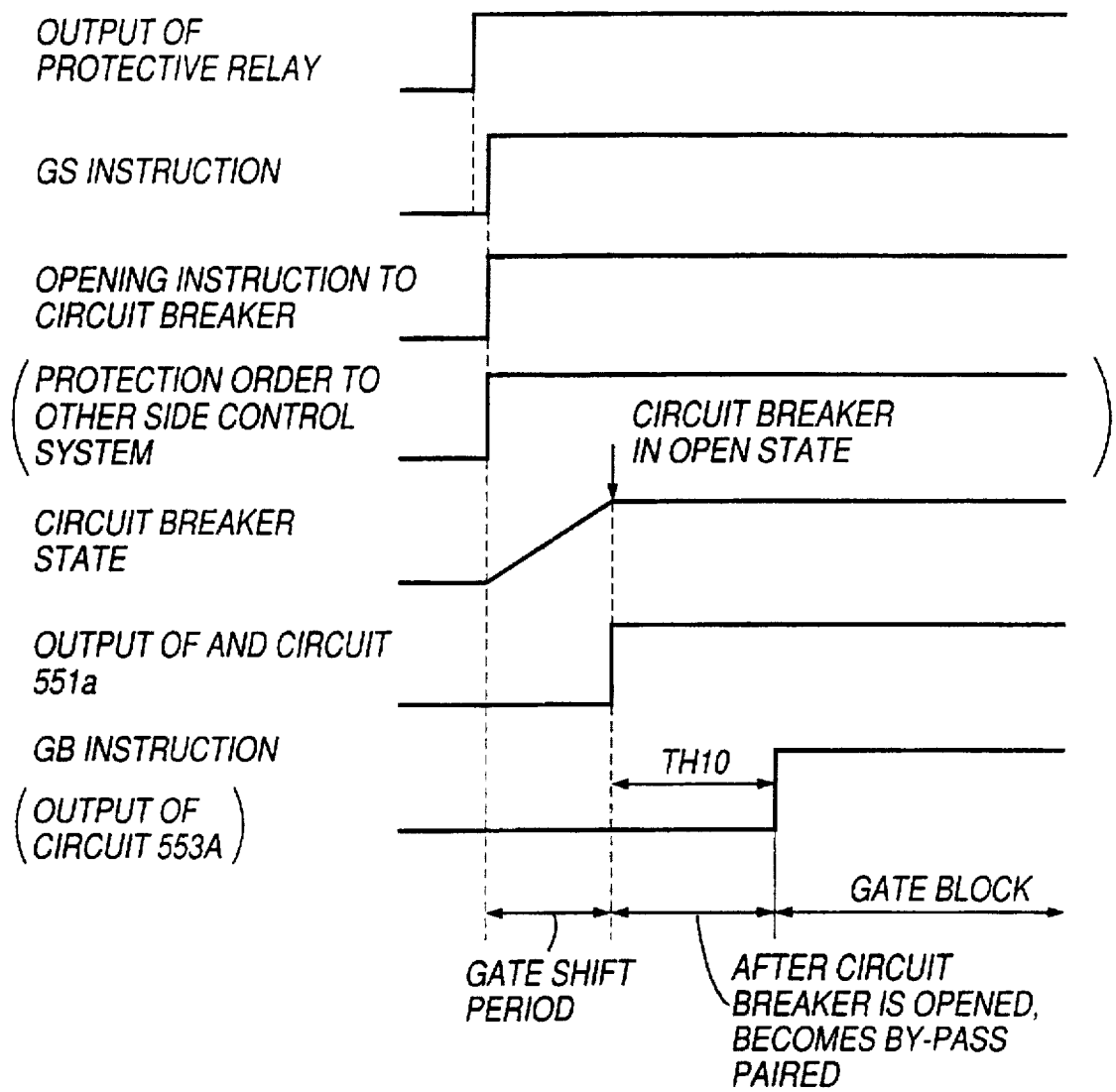
FIG. 15 is a timing chart showing an operation of the sixth embodiment of this invention.

In the sixth embodiment, the system is in such the construction that in addition to the construction of the fifth embodiment shown in FIG. 12, circuit breaker state detector 551A and digital interface circuit 552A are newly added. A protection order signal is held by own side protection order signal holding circuit 531A and then circuit breaker opening instruction CBT is output to circuit breaker 1A. After that, when the open state signal is received from circuit breaker 1A, gate block instruction GB is output to phase controller 50A from an on-delay timer 551b at an on-delay time TH10 after the open state signal is received. The timing chart at this state is shown in FIG. 15.

Accordingly, if the system is constructed as the sixth embodiment, the same action and effect as the fifth embodiment are obtained. In addition, as firing pulses are gate blocked by the circuit breaker open state signal, the converter is never operated ever when the circuit breaker is turned ON unnecessarily.

Figure 16:
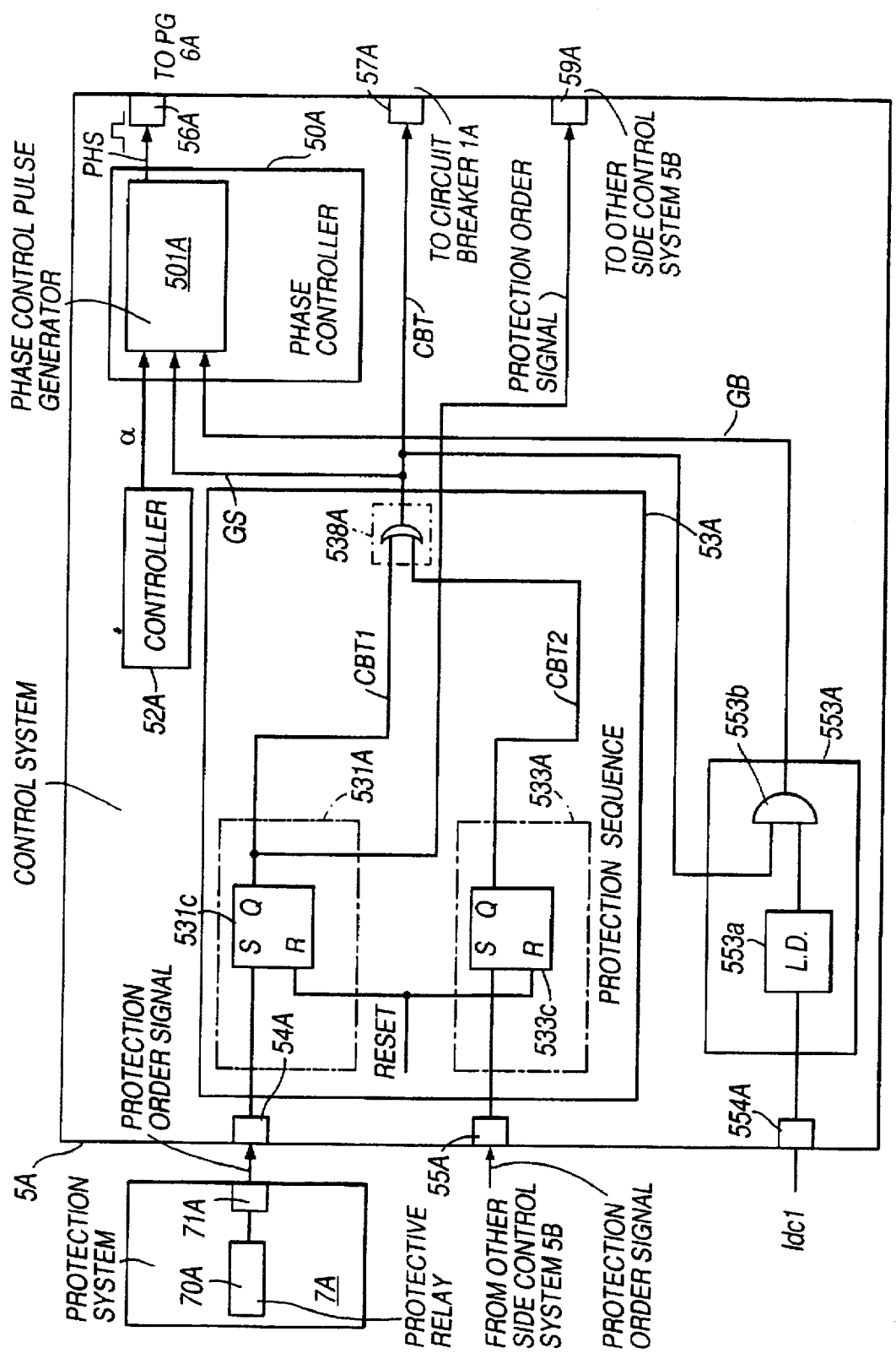
FIG. 16 is a block diagram showing an essential part of a control and protection system for an AC-DC conversion system according to a seventh embodiment of this invention.

FIG. 16 is a block diagram showing the construction of a seventh embodiment of the present invention.

Needless to say, in this embodiment although it is possible to provide the construction shown in the block diagrams of the modifications of the first embodiment shown in FIGS. 4 and 5, it will be omitted here for making the explanation simple.

Figure 17:
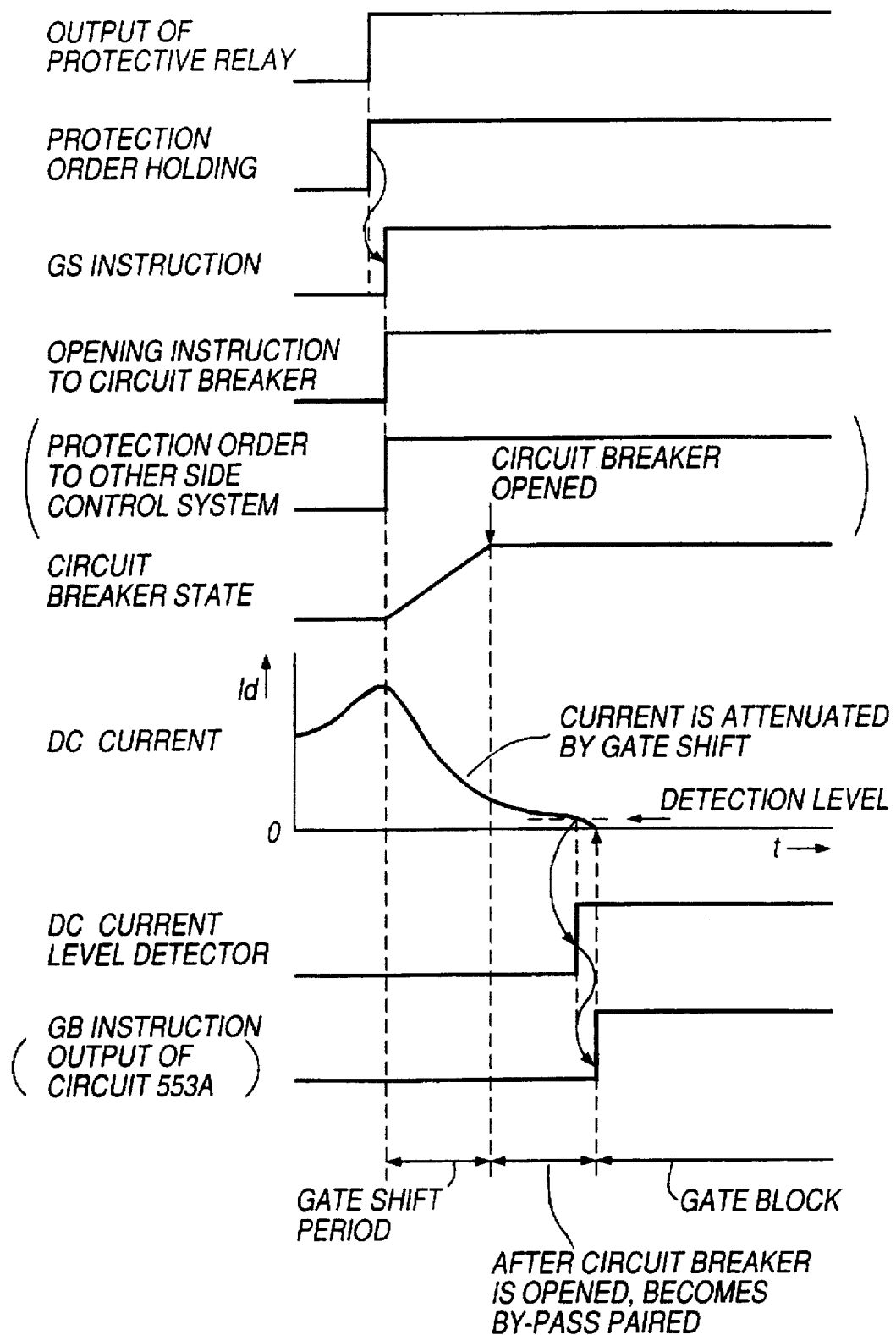
FIG. 17 is a timing chart showing an operation of the seventh embodiment of this invention.

In the seventh embodiment, the system is in such the construction that in addition to the construction of the fifth embodiment shown in FIG. 12, DC current state detector 553A and digital interface circuit 554A are newly added. A protection order signal is held by own side protection order signal holding circuit 531A and then circuit breaker opening instruction CBT is output to circuit breaker 1A. After that gate blocking instruction GB is output to phase controller 50A under the condition that DC current Idc1 drops to below a current value set by level detector 553a. The timing chart at this state is shown in FIG. 17.

Accordingly, if the system is constructed as the seventh embodiment, the same action and effect as the fifth embodiment are obtained. In addition, as firing pulses are gate blocked after DC current is attenuated to below a fixed value, the converter is never operated even when the circuit breaker is turned ON unnecessarily. Furthermore, as the gates are blocked after current becomes sufficiently small and the thyristor valves composing the converter are turned OFF, it is possible to stop the converter more safely.

Figure 18:
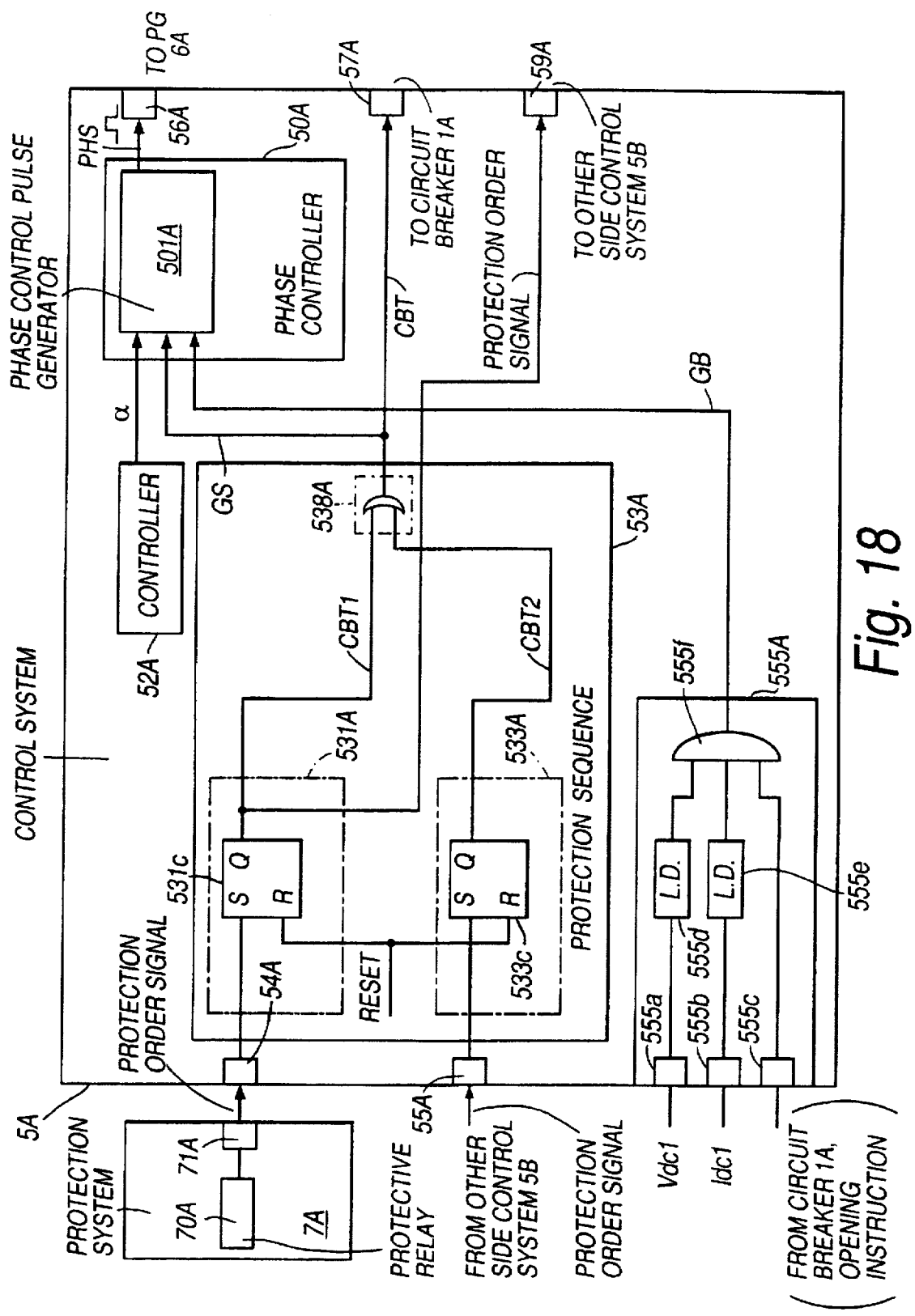
FIG. 18 is a block diagram showing an essential part of a control and protection system for an AC-DC conversion system according to an eighth embodiment of this invention.
Figure 19:
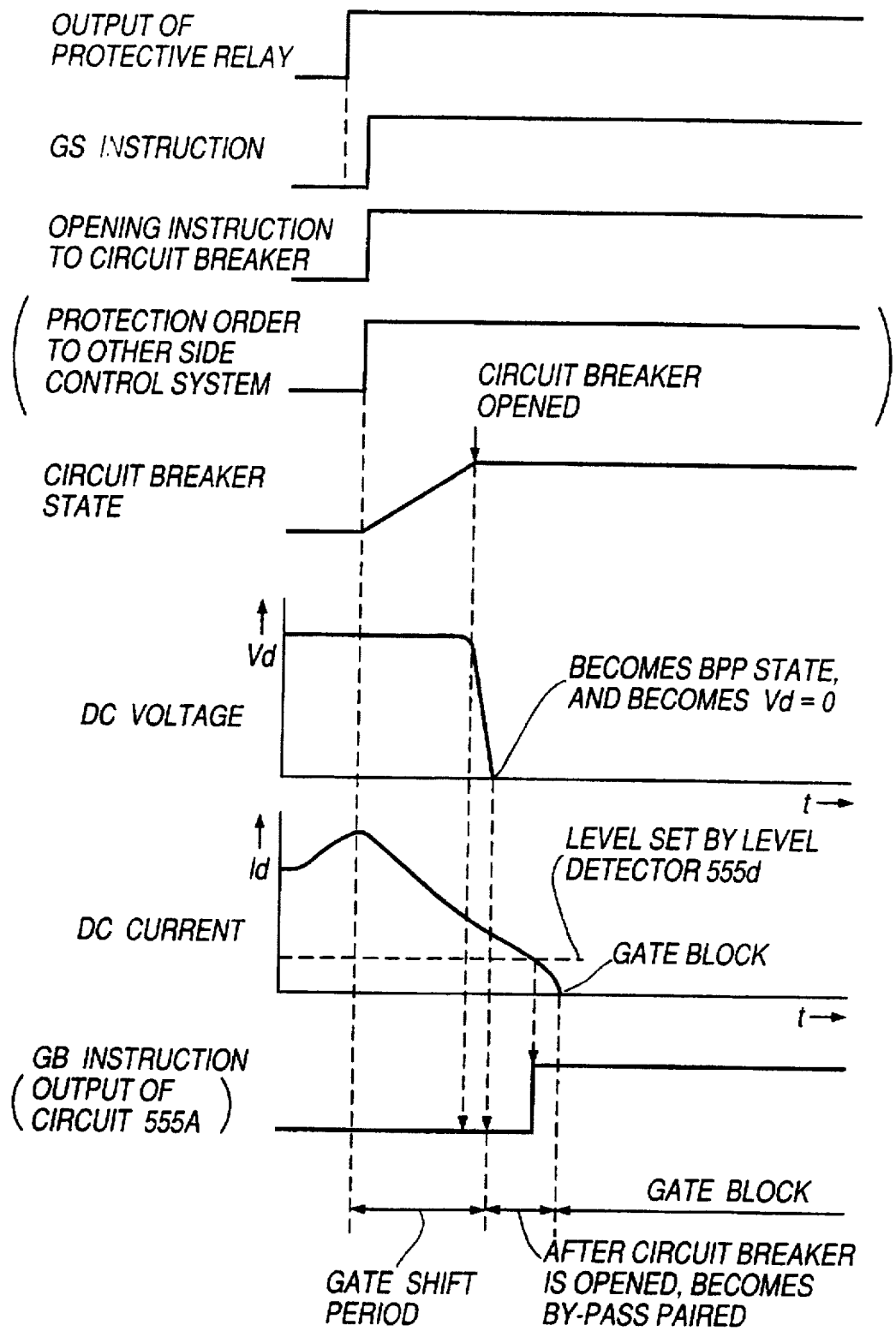
FIG. 19 is a timing chart showing an operation of the eighth embodiment of this invention.
Figure 20:
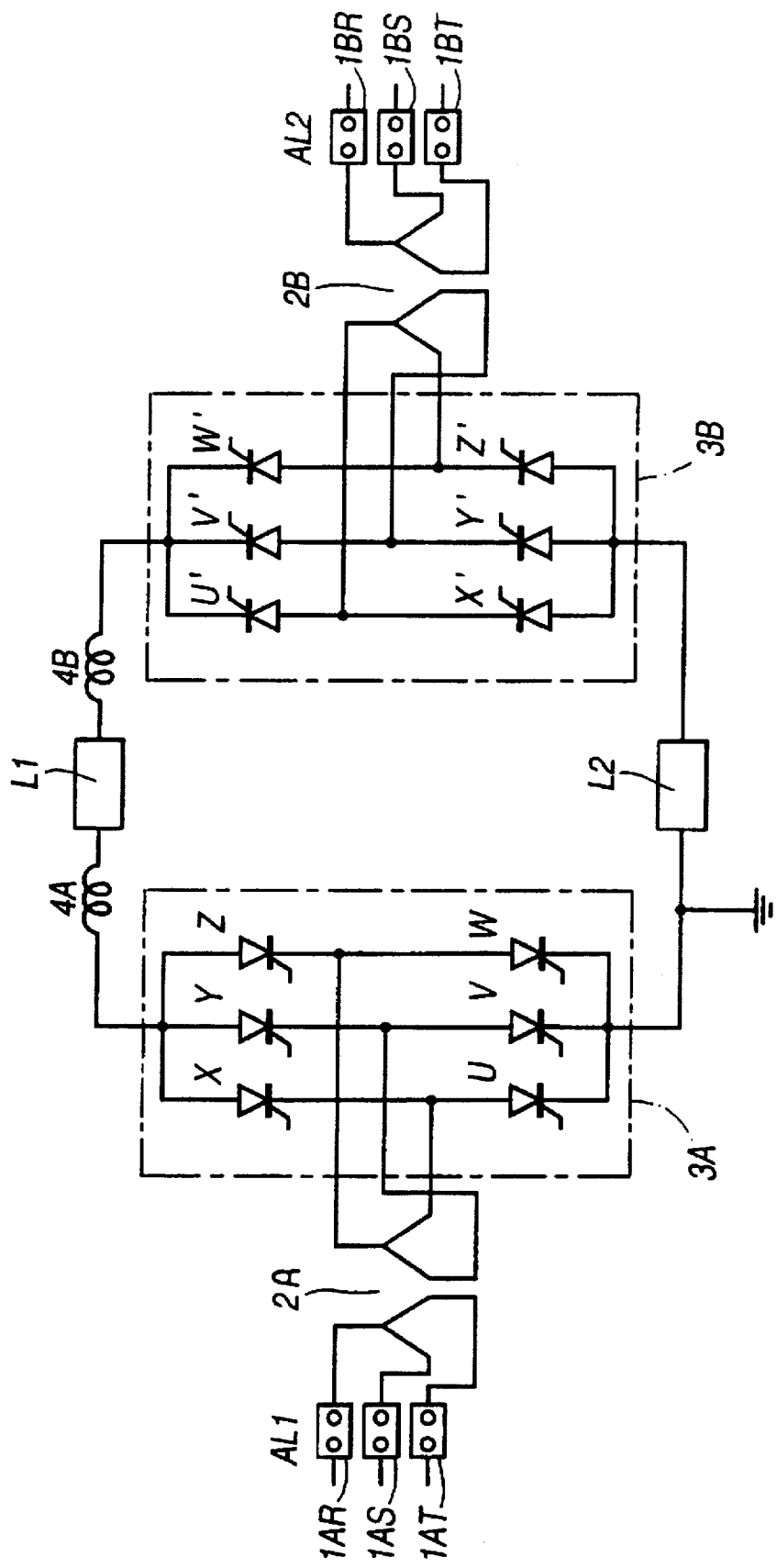
FIG. 20 is a block diagram showing an example of a main circuit system of a conventional AC-DC conversion system.
Figure 21A:
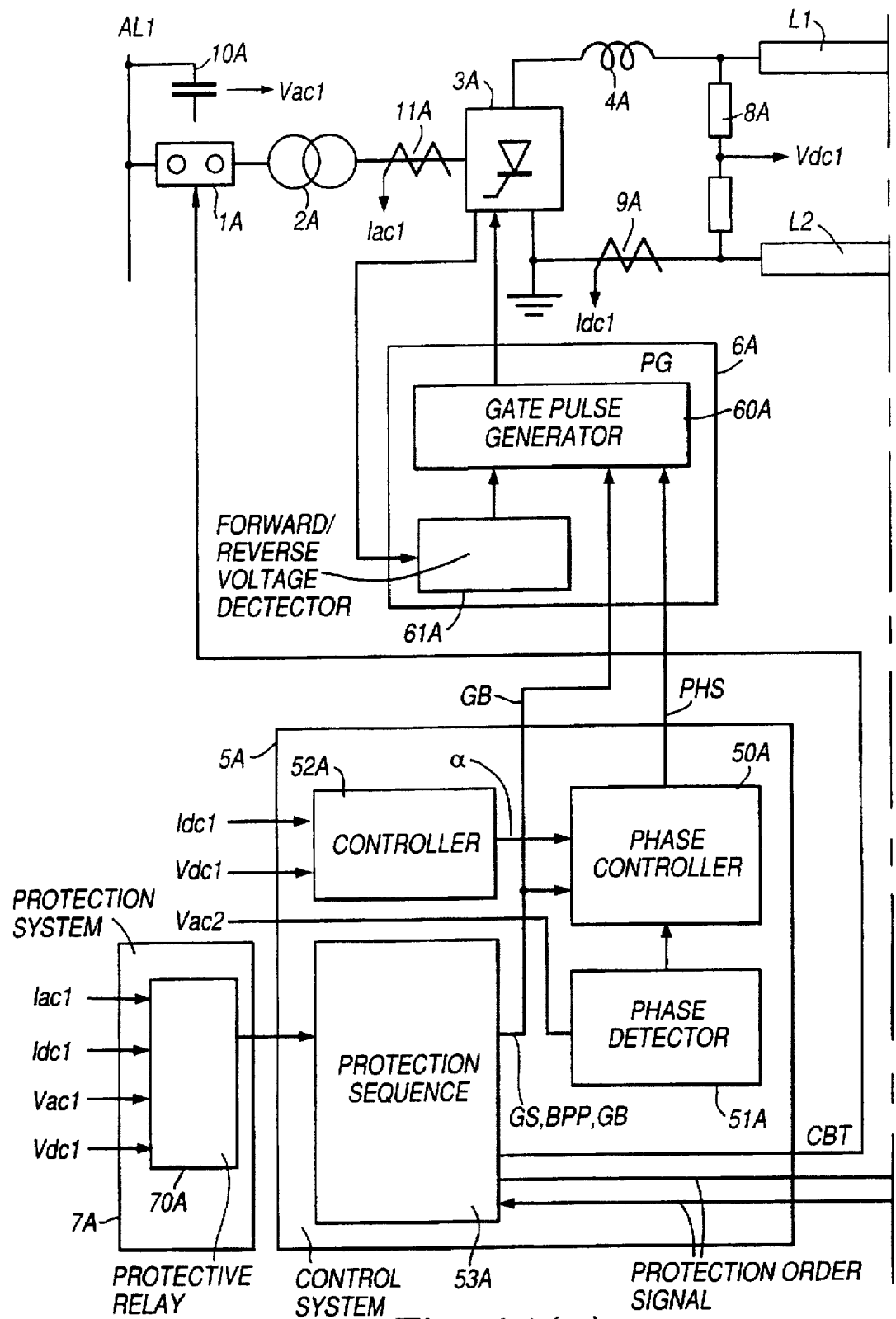
FIG. 21 is a block diagram showing an example of a conventional control and protection system for an AC-DC conversion system.
Figure 21B:
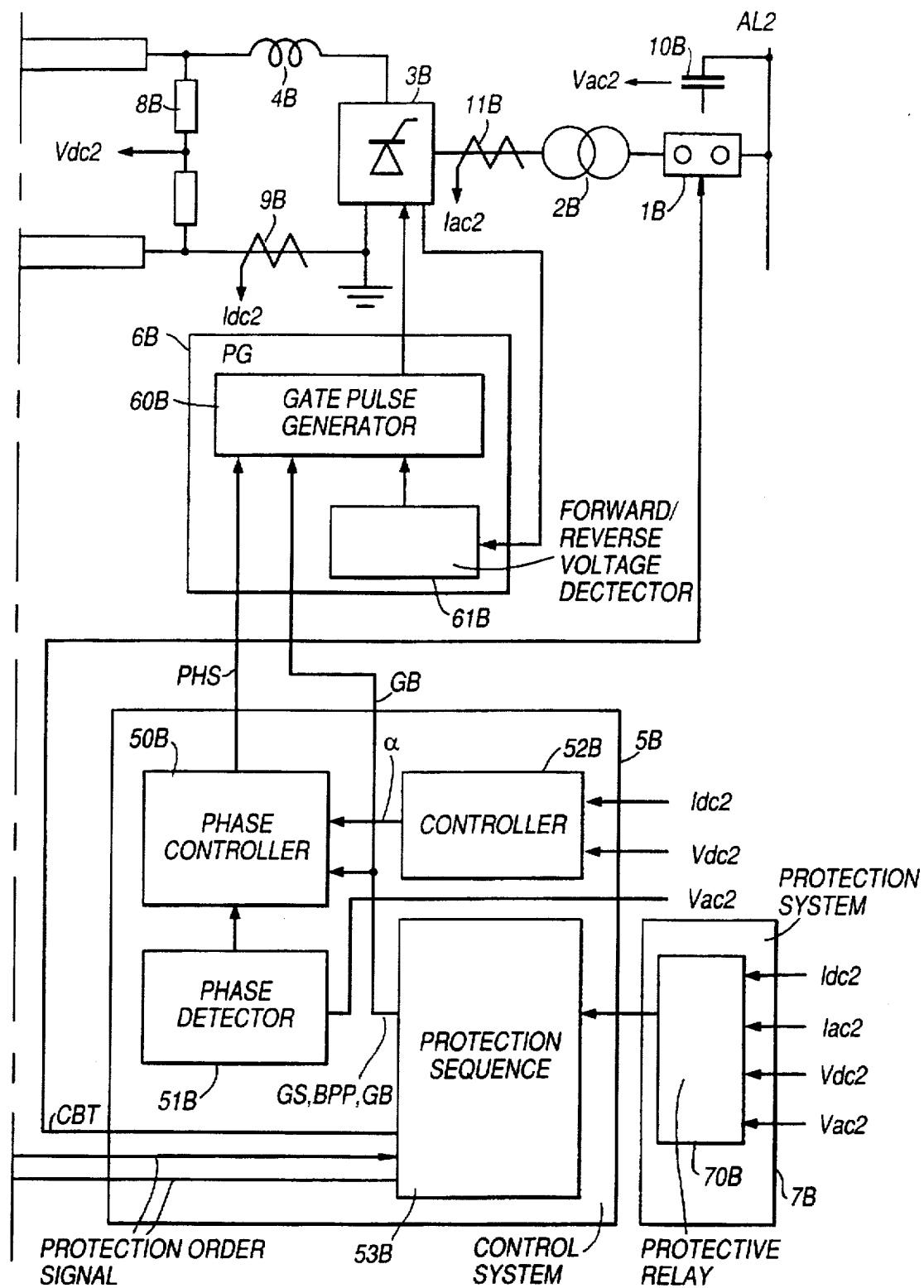

FIG. 18 is a block diagram showing the construction of an eighth embodiment of the present invention.

Needless to say, in this embodiment although it is also possible to provide the construction shown in the block diagrams of the modifications of the first embodiment shown in FIGS. 4 and 5, it will be omitted here for making the explanation simple.

In the eighth embodiment, the system is in such the construction that in addition to the construction of the fifth embodiment shown in FIG. 12, by-pass paired state detector 555A is newly added. A protection order signal is held by own side protection order signal holding circuit 531A and then circuit breaker opening instruction CBT is output to circuit breaker 1A. After that, when circuit breaker 1A is in the open state, gate blocking instruction GB is output to phase controller 50A by detecting converter 3A is in the by-pass paired state under the condition that DC voltage Vdc1 is zero voltages set by level detector 555d and DC current Idc1 drops to below a current value set by level detector 555e. The timing chart at this state is shown in FIG. 17. Further, as another embodiment of by-pass paired state detector 555A, there is such a method to detect the by-pass paired state by detecting that current is simultaneously flowing through series connected thyristor valves based on detecting current flowing through the thyristor valves of the converter.

Accordingly, if the system is constructed as the eighth embodiment, the same action and effect as the fifth embodiment are obtained. In addition, as firing pulses are gate blocked after detecting the by-pass paired state by the means for detecting that the converter is in the by-pass paired state, the converter is never operated when the circuit breaker is turned ON unnecessarily. Furthermore, as the gates are blocked after the converter is turned in the by-pass paired stated, it is possible to prevent the inverter gate blocking more certainly.

As described above, according to a control and protection system of an AC-DC conversion system of the present invention, when such faults as ground fault, valve short-circuit, etc. are generated in the converter, there is no overcurrent resulting from the by-pass pair operation, as the by-pass pair operation is not executed by a protection sequence means. Accordingly, it is possible to protect the system without damaging the converter. Further, in the conventional system, such defects as the inverter instantaneous gate blocking occur in the case, such as the normal side control system can not receive a protection order signal from the control system at the fault side for some reason. In this invention, even for such cases, it is possible to prevent that converter is damaged, as it is placed in the by-pass paired state by opening AC circuit breaker during the commutating operation of converter.

Obviously, numerous modifications and variations of the present invention are possible in light of the above teachings. It is therefore to be understood that within the scope of the appended claims, the invention may be practiced otherwise than as specifically described herein.

What is claimed is:

1. A control and protection system for an AC-DC conversion system for exchanging an electric power between two AC power systems, said AC-DC conversion system being composed of two power converters with DC sides connected to each other and two circuit breakers respectively connected between AC sides of said two power converters and said two AC power systems, each of said power converters being composed of a plurality of switching devices controlled by a gate signal and converting AC power into DC power or DC power into AC power, said control and protection system being composed of two control and protection means, each of which is provided for one of said power converters, respectively, each of said control and protection means comprising:

protection means for detecting a fault of said power converter to generate a first protection order signal when said fault is detected;

phase control means for continuously generating firing pulses to said switching devices of said power converter; and protection sequence means connected to said protection means for receiving said first protection order signal, for holding said first protection order signal, for generating an opening instruction to said circuit breaker, and for generating a second protection order signal for stopping said power converter at another side to said control and protection means at said another side, while said firing pulses are being supplied to said switching devices of said power converter.

2. The control and protection system for an AC-DC conversion system according to claim 1, further comprising:

gate block means for detecting that said circuit breaker is opened and for generating a gate blocking instruction after said circuit breaker is opened;

wherein said phase control means is connected to receive said gate blocking instruction from said gate block means and blocks to generate said firing pulses to said switching devices of said power converter.

3. The control and protection system for an AC-DC conversion system according to claim 1, further comprising:

gate block means for detecting that a DC current flowing through said power converter is below a predetermined current value and for generating a gate blocking instruction after said DC current becomes below said predetermined current value;

wherein said phase control means is connected to receive said gate blocking instruction from gate block means and blocks to generate said firing pulses to said switching devices of said power converter.

4. The control and protection system for an AC-DC conversion system according to claim 1, further comprising:

gate block means for detecting that said power converter is in a by-pass paired state after said circuit breaker is opened and for generating a gate blocking instruction after said power converter becomes in said by-pass paired state;

wherein said phase control means is connected to receive said gate blocking instruction from said gate block means and blocks to generate said firing pulses to said switching devices of said power converter after said power converter becomes in said by-pass paired state.

5. The control and protection system for an AC-DC conversion system according to claim 1:

wherein said protection sequence means is further connected to said control and protection means at said another side for receiving said second protection order signal, holds said second protection order signal, and generates said opening instruction to said circuit breaker, while said firing pulses are being supplied to said switching devices of said power converter.

6. A control and protection system for an AC-DC conversion system for exchanging an electric power between two AC power systems, said AC-DC conversion system being composed of two power converters with DC sides connected to each other and two circuit breakers respectively connected between AC sides of said two power converters and said two AC power systems, each of said power converters being composed of a plurality of switching devices controlled by a gate signal and converting AC power into DC power or DC power into AC power, said control and protection system being composed of two control and protection means, each of which is provided for one of said power converters, respectively, each of said control and protection means comprising:

protection means for detecting a fault of said power converter to generate a first protection order signal when said fault is detected;

phase control means for generating firing pulses to said switching devices of said power converter; and protection sequence means connected to said protection means for receiving said first protection order signal, for holding said first protection order signal, for generating a gate shift instruction, for generating an opening instruction to said circuit breaker, and for generating a second protection order signal for stopping said power converter at another side to said control and protection means at said another side;

said phase control means being connected to receive said gate shift instruction from said protection sequence means and generating said firing pulses of a gate shift phase to said switching devices of said power converter after said gate shift instruction is received.

7. The control and protection system for an AC-DC conversion system according to claim 6, further comprising:

gate block means for detecting that said circuit breaker is opened during a gate shift period and for generating a gate blocking instruction after said circuit breaker is opened;

wherein said phase control means is further connected to receive said gate blocking instruction from said gate block means and blocks to generate said firing pulses to said switching devices of said power converter.

8. The control and protection system for an AC-DC conversion system according to claim 6, further comprising:

gate block means for detecting that a DC current flowing through said power converter is below a predetermined current value during a gate shift period and for generating a gate blocking instruction after said DC current becomes below said predetermined current value;

wherein said phase control means is further connected to receive said gate blocking instruction from gate block means and blocks to generate said firing pulses to said switching devices of said power converter.

9. The control and protection system for an AC-DC conversion system according to claim 6, further comprising:

gate block means for detecting that said power converter is in a by-pass paired state after said circuit breaker is opened during a gate shift period and for generating a gate blocking instruction after said power converter becomes in said by-pass paired state;

wherein said phase control means is further connected to receive said gate blocking instruction from said gate block means and blocks to generate said firing pulses to said switching devices of said power converter after said power converter becomes in said by-pass paired state.

10. The control and protection system for an AC-DC conversion system according to claim 6:

wherein said protection sequence means is further connected to said control and protection means at said another side for receiving said second protection order signal, holds said second protection order signal, generates said gate shift instruction and generates said opening instruction to said circuit breaker.

* * * * *